United States Patent
Stephenson et al.

(10) Patent No.: US 11,271,671 B2
(45) Date of Patent: Mar. 8, 2022

(54) WLAN TESTING USING AN RF ABSTRACTION LAYER

(71) Applicant: ARRIS Enterprises LLC, Suwanee, GA (US)

(72) Inventors: David Sheldon Stephenson, San Jose, CA (US); Doron Givoni, San Jose, CA (US); Sandip C. Patel, San Jose, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 82 days.

(21) Appl. No.: 16/746,832

(22) Filed: Jan. 18, 2020

(65) Prior Publication Data

US 2020/0162188 A1 May 21, 2020

Related U.S. Application Data

(63) Continuation of application No. 15/538,629, filed as application No. PCT/US2014/072974 on Dec. 31, 2014, now Pat. No. 10,574,386.

(51) Int. Cl.
*H04L 1/00* (2006.01)
*H04L 12/46* (2006.01)
(Continued)

(52) U.S. Cl.
CPC ......... *H04L 1/0003* (2013.01); *H04B 7/0897* (2013.01); *H04B 17/318* (2015.01);
(Continued)

(58) Field of Classification Search
CPC combination set(s) only.
See application file for complete search history.

(56) References Cited

U.S. PATENT DOCUMENTS

| 7,697,688 B1* | 4/2010 | Loc | H04W 12/04 380/262 |
| 8,027,366 B1* | 9/2011 | Tang | H04L 1/0079 370/474 |

(Continued)

FOREIGN PATENT DOCUMENTS

| EP | 2421293 A1 | 2/2012 |
| WO | 2013085363 | 6/2013 |

OTHER PUBLICATIONS

Guo Chunhong, et al., "A Zigbee and Bluetooth Protocol Converter Based on Multi-sinks Wireless Sensor Network," Journal of Networks, vol. 9, No. 7, Jul. 2014.
(Continued)

*Primary Examiner* — Yee F Lam
(74) *Attorney, Agent, or Firm* — Steven Stupp; Stewart Wiener

(57) ABSTRACT

A technique for testing wireless-local-area-network (WLAN) infrastructure is described. In particular, a radio-frequency abstraction layer (RFAL) in a physical instance of an electronic device is used to simulate the physical layer communication hardware and radio channels. RFAL allows frames in initial packets that are compatible with a WLAN communication protocol (such as an IEEE 802.11 standard) to be encapsulated in the data-link layer into additional packets that are compatible with a network communication protocol (such as an IEEE 802.3 standard). These additional packets can include information that characterizes transmission of the packet through a simulated radio-frequency environment so that the software stack associated with a physical or virtual instance of an electronic device can be exercised as if the packet had been received over a wireless connection. Then, the additional packets can be communicated via Ethernet (i.e., without radio-frequency communi-
(Continued)

cation) among virtual instances of access points, clients and/or WLAN controllers.

20 Claims, 10 Drawing Sheets

(51) Int. Cl.
  H04B 17/318  (2015.01)
  H04B 17/336  (2015.01)
  H04B 17/391  (2015.01)
  H04B 7/08  (2006.01)
  H04W 80/02  (2009.01)
  H04W 80/08  (2009.01)
  H04W 24/06  (2009.01)
  H04B 17/345  (2015.01)

(52) U.S. Cl.
  CPC ......... *H04B 17/336* (2015.01); *H04B 17/345* (2015.01); *H04B 17/391* (2015.01); *H04L 1/0009* (2013.01); *H04L 12/4633* (2013.01); *H04W 80/02* (2013.01); *H04W 80/08* (2013.01); *H04L 2212/00* (2013.01); *H04W 24/06* (2013.01)

(56) References Cited

U.S. PATENT DOCUMENTS

| | | | |
|---|---|---|---|
| 10,602,388 B1* | 3/2020 | Rengarajan | H04W 24/10 |
| 2005/0063416 A1 | 3/2005 | Shin et al. | |
| 2005/0114489 A1* | 5/2005 | Yonge, III | H04L 1/0061 |
| | | | 709/223 |
| 2005/0141480 A1 | 6/2005 | Jin et al. | |
| 2006/0140172 A1 | 6/2006 | Trainin | |
| 2006/0285604 A1* | 12/2006 | Walton | H04L 1/0072 |
| | | | 375/267 |
| 2007/0076648 A1 | 4/2007 | Yong et al. | |
| 2007/0186134 A1* | 8/2007 | Singh | H04L 1/1614 |
| | | | 714/749 |
| 2008/0165968 A1* | 7/2008 | Yadav | H04W 12/033 |
| | | | 380/270 |
| 2008/0181101 A1* | 7/2008 | Oh | H04L 1/1887 |
| | | | 370/218 |
| 2010/0246416 A1 | 9/2010 | Sinha et al. | |
| 2011/0188487 A1 | 8/2011 | Seok | |
| 2011/0222408 A1* | 9/2011 | Kasslin | H04L 41/083 |
| | | | 370/241 |
| 2012/0207030 A1 | 8/2012 | Luong | |
| 2013/0107869 A1 | 5/2013 | Abraham et al. | |
| 2013/0322286 A1 | 12/2013 | Van Doorselaer et al. | |
| 2014/0112322 A1* | 4/2014 | Ram | H04W 28/065 |
| | | | 370/338 |
| 2014/0254351 A1* | 9/2014 | Newman | H04L 1/1809 |
| | | | 370/228 |
| 2014/0254647 A1* | 9/2014 | Stott | H04L 43/12 |
| | | | 375/224 |
| 2016/0212768 A1* | 7/2016 | Wentink | H04W 16/14 |
| 2016/0234720 A1* | 8/2016 | Barany | H04W 28/22 |

OTHER PUBLICATIONS

PCT International Search Report and Written Opinion of the International Searching Authority, PCT/US14/072974, dated Dec. 31, 2014.

* cited by examiner

WLAN TESTING USING AN RF ABSTRACTION LAYER

CROSS REFERENCE TO RELATED APPLICATIONS

This application is a Continuation of U.S. patent application Ser. No. 15/538,629, entitled "WLAN Testing Using an RF Abstraction Layer," by David Sheldon Stephenson, filed on Jun. 21, 2017, which claims priority under 35 U.S.C. 371 to International Application No. PCT/US2014/072974, "WLAN Testing Using an RF Abstraction Layer," by David S. Stephenson, filed on Dec. 31, 2014, the contents of both of which are herein incorporated by reference.

BACKGROUND

Field

The described embodiments relate to techniques for testing a wireless network.

Related Art

Many physical instances electronic devices communicate wirelessly with other electronic devices. For example, physical instances of electronic devices can include a networking subsystem that implements a network interface for: a wireless wide area (such as cellular) or local area network (e.g., a wireless network such as described in the Institute of Electrical and Electronics Engineers (IEEE) 802.11 standard or Bluetooth® from the Bluetooth Special Interest Group of Kirkland, Wash.), and/or another type of wireless network. In principle, these communication capabilities facilitate a wide variety of applications and services. In practice, in order for these applications and services to work properly, detailed testing of the electronic devices and the systems that include them are typically required.

However, it is often difficult to conduct realistic testing of physical instances of the electronic devices and the systems that include them. For example, in the case of a wireless local area network (WLAN) based on an IEEE 802.11 standard, consider testing of wireless-local-area-network (WLAN) controllers. Testing the performance of a WLAN controller may require tens of thousands of physical instances of access points (APs) and hundreds of thousands of mobile devices. This is prohibitive from a cost perspective, as well as from a logistics perspective (where would all of these APs and mobile devices be placed?). For these reasons, testing can be performed using AP simulators. An AP simulator is a computer program that executes on a physical instance of an AP or a server, and which generates traffic to and from a WLAN controller by simulating communication between a client (such as a smartphone of a user) and the physical instance of the AP or the server. But it is often very difficult to build an AP simulator to realistically simulate the protocols and behaviors of many APs and clients. In the absence of such realistic testing, it can be difficult for providers of electronic devices and systems to ensure proper functioning, which can disrupt applications and services and, thus, system performance.

SUMMARY

The described embodiments include an electronic device that includes: a network interface circuit; a processor coupled to the network interface circuit; and a memory that stores a program module that is executed by the processor during operation of the electronic device. When the processor executes the program module, the processor: encapsulates, without regard to a type of MPDU, a first media access control (MAC) layer protocol data unit (MPDU) compatible with a wireless physical layer communication protocol and adds additional information that characterizes transmission of the first MPDU through a modeled radio-frequency environment into a second MPDU compatible with a wired medium communication protocol.

Moreover, the processor may communicate, via the network interface circuit, the second MPDU to another electronic device over at least one wired medium. Furthermore, the processor may generate the second MPDU.

Note that the additional information may include: path-loss, attenuation, data rate, throughput, and/or a phase angle of arrival.

Additionally, the modeled radio-frequency environment may be related to specific geo-spatial coordinates of one of: an environment, a portable electronic device, and an access point. For example, the geo-spatial coordinates of the portable electronic device, and/or the access point may be time-varying.

In some embodiments, the additional information includes layer 3 addressing.

Moreover, the processor may encapsulate IEEE 802.11 control frames and/or IEEE 802.11 management frames.

Furthermore, the processor may detect a third MPDU compatible with a wireless physical layer communication protocol including additional information that characterizes a second simulated radio-frequency environment encapsulated in a fourth MPDU compatible with a wired medium communication protocol received from a wired medium. In response, the processor may: de-encapsulate the detected the third MPDU; and process the third MPDU in accordance with the additional information accompanying the third MPDU. This process of the third MPDU may occur without using the wireless physical layer that communicates frames via the wireless medium. Alternatively or additionally, the processing of the third MPDU may include communicating the third MPDU to another electronic device. In some embodiments, the processor: de-encapsulates the detected the third MPDU; determines transmit information in accordance with the additional information accompanying the third MPDU; and transmits the third MPDU over a wireless interface circuit and an antenna coupled to the wireless interface circuit in accordance with the transmit information. Note that the third MPDU may originate from a location outside a radio-frequency range of the electronic device.

Another embodiment provides a computer-program product for use with the electronic device. This computer-program product includes instructions for at least some of the operations performed by the electronic device.

Another embodiment provides a method for communicating the second media access control (MAC) layer protocol data unit (MPDU). This method includes at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
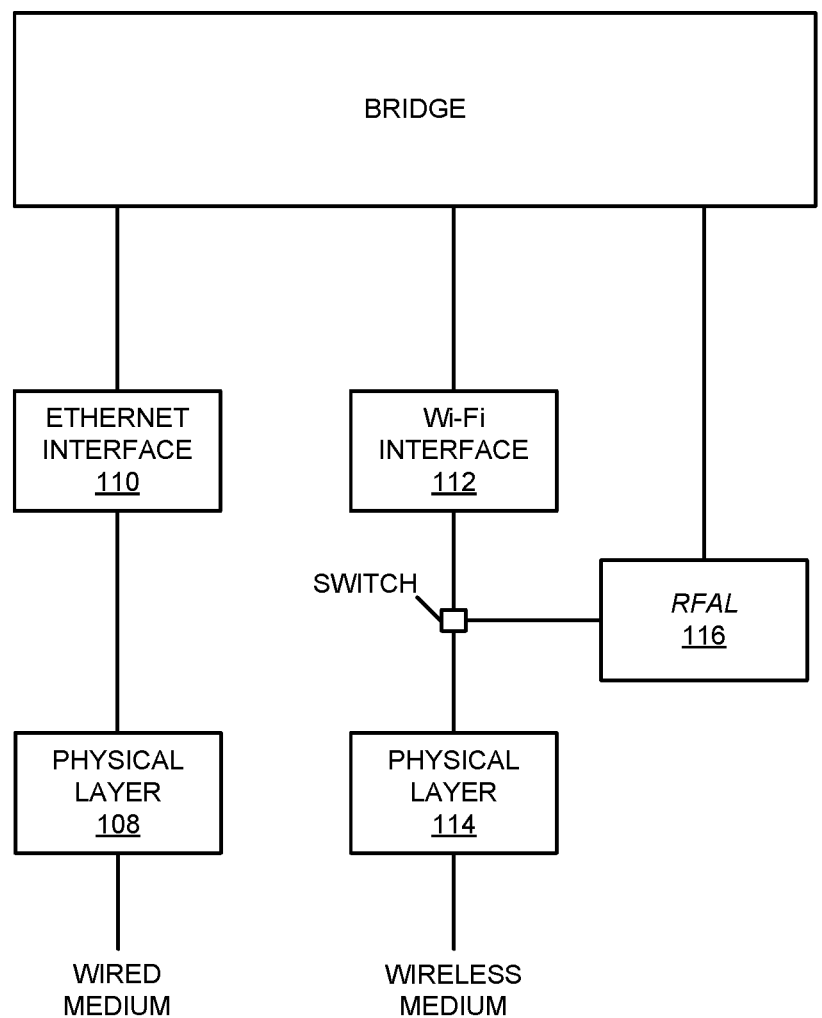
FIG. 1 is a drawing illustrating operation of an access point (AP) in accordance with embodiments of the present disclosure.

A technique for testing wireless-local-area-network (WLAN) infrastructure is described. In particular, a radio-frequency abstraction layer (RFAL) in a physical instance or virtual instance of an electronic device (such as a physical instance or virtual instance of an access point or AP) is used to simulate the physical layer communication hardware (such as a WLAN interface circuit and an antenna) and radio channels. RFAL allows frames in initial packets that are compatible with a WLAN communication protocol (such as an IEEE 802.11 standard or an LTE standard, to name just two) to be encapsulated (e.g., in the data-link layer) into additional packets that are compatible with a network communication protocol, such as a wired network communication protocol (e.g., Ethernet II or an IEEE 802.3 standard). These additional packets can include information that characterizes transmission of the packet through a simulated radio-frequency environment so that the software stack associated with a physical or virtual instance of an electronic device can be exercised as if the packet had been received over a wireless connection. Then, the additional packets can be communicated via Ethernet (i.e., without radio-frequency communication) among real and/or virtual instances of APs, clients (such as portable electronic devices, smartphones or cellular telephones) and/or WLAN controllers that execute on servers (e.g., in cloud-based servers). In this discussion, note that 'Ethernet' may include 'an Ethernet II standard.' Moreover, in the discussion that follows an 'electronic device' may include physical instance of an electronic device (such as an AP), or may include a server that executes software for a virtual instance of the electronic device (such as a virtual AP, a virtual machine or a virtual appliance).

Consequently, RFAL allows virtual instances of APs and clients (or a mix of physical instances and virtual instances of APs and clients) to be used in very large scale, realistic end-to-end testing of a WLAN system, or in some instances, testing all or part of a deployment. Moreover, the testing may be conducted in less time and with reduced expense, without introducing additional bugs or failing to test portions of the software stack that process WLAN communication protocol information. This realistic testing can eliminate a significant deployment risk for application developers and service providers. In addition, the resulting applications and services may be more reliable, which may improve system performance and, thus, customer satisfaction.

In the discussion that follows, the physical instances of the electronic devices include radios that wirelessly communicate packets in accordance with a communication protocol, such as an Institute of Electrical and Electronics Engineers (IEEE) 802.11 standard (which is sometimes referred to as 'Wi-Fi®,' from the Wi-Fi Alliance of Austin, Tex.), Bluetooth (from the Bluetooth Special Interest Group of Kirkland, Wash.), and/or another type of wireless interface. In some embodiments, the physical instances of the electronic devices include radios that communicate using a communication protocol that is compatible with: a $2^{nd}$ generation of mobile telecommunications technology, a $3^{rd}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique. In the discussion that follows, Wi-Fi is used as an illustrative example. However, the radios in the physical instance of the electronic devices may use a wide variety of communication protocols. Thus, one of ordinary skill in the art can see how the concepts below could be applied in a system where the AP concept is substituted with an LTE small cell.

As discussed previously, typical AP simulators often do not accurately reproduce the communication and interactions with clients (i.e., end-user equipment) because the AP simulators may assume some of the responsibilities of the clients during the testing. In particular, a typical AP simulator simulates, for example, associating to a WLAN, negotiating cryptographic keys and establishing link-layer encryption, obtaining an IP address, performing Domain Name System name resolution, and/or sending and receiving traffic while assuming the responsibilities of the clients during the testing. This can significantly change the software state and the functionality of an AP simulator when compared to a real or a physical instance of an AP. Consequently, the software used during normal operation in a real AP is often not tested completely or accurately by the typical AP simulator because of the absence of client/AP interactions. In addition, WLAN controllers and other infrastructure equipment are often not tested completely or accurately because of the absence of client/AP interactions. In some cases the complexity of simulating particular functions is so great, it's simply not included in the typical AP simulator (e.g., establishing link-layer encryption), which can further diminish the value of the typical AP simulator. Moreover, the development effort required in this approach is effectively doubled because the software for a new feature may need to be written separately for the software used during normal operation in the real AP and for the AP simulator. In addition to the added time and expense, because the software used during normal operation in the real AP and in the AP simulator are often written by different developers, this work by different developers can result in additional bugs in the software used during normal operation in the real AP and in the AP simulator that are not properly tested.

Furthermore, using actual radio-frequency communication between a very large number of clients and APs during testing is typically not an option, because of the complications that occur when there are a large number of physical instances of electronic devices, the resulting testing complexity, interference and the physical space required. Consequently, realistic, end-to-end, very large-scale testing of systems is often challenging.

These challenges are addressed by adding a selectively activated bridge between different communication protocols in a Media Access Control (MAC) Layer in a physical or virtual instance of an electronic device (such as an access point or a portable electronic device, e.g., a smartphone). In addition, when activated (such as during testing of a physical instance of the electronic device) this bridge allows the portions of the physical layer in the physical instance of the electronic device to be disabled or decoupled. Instead, tags may be added to packets with information characterizing the transmission of the packet through a simulated radio-frequency environment of the physical instance of the electronic device. Thus, the bridge, which is henceforth referred to as a radio-frequency abstraction layer (RFAL), virtualizes the radio-frequency interface and environment of the physical instance of the electronic device. These capabilities may facilitate testing of the physical instance of the electronic device and systems that include the physical instance of the electronic device. Note that the physical instance of the electronic device may include: an AP or a client device (which is sometimes referred to 'user equipment' or UE, or a portable electronic device, such as a smartphone). However, as noted previously, the electronic device(s) used during the testing may include: a virtual AP (vAP) or a virtual client device (which is sometimes referred to as 'virtual user equipment' or vUE). As described further below with reference to FIG. 8, these virtual instances of the electronic device(s) may also leverage RFAL because, for example, they can simulate the RF communications without requiring RF communication. Moreover, as described further below, the difference between a vAP and an AP or a vUE and a UE is the absence of a physical radio. Thus, a vAP (or a vUE) should be understood to mean an AP (or a UE) that runs on a general-purpose computer or server not possessing RF circuitry for the transmission and reception of radio waves over the air. In the discussion that follows, an AP is used as an illustration of the physical instance of the electronic device and the operation of RFAL. Note that an AP may be defined as a layer-2 device that bridges IEEE 802.11 frames to another link-layer protocol (such as IEEE 802.3).

FIG. 1 presents a functional block drawing illustrating operation of AP 100 in accordance with some embodiments. In particular, during normal operation of AP 100, communications including packets to be transmitted may be received via a link to a network (such as the Internet) using physical layer 108 and Ethernet interface 110, which does MAC-layer processing on communications to and from the wired medium. Then, a Wi-Fi interface 112, which does MAC-layer processing on communications to and from the physical layer 114, may add information to the packets to be transmitted (such as the IEEE 802.11 MAC header) that is compatible with Wi-Fi, which are all wirelessly communicated to one or more other physical instances of electronic devices (such as one or more portable electronic devices) via physical layer 114 (including an interface circuit and one or more antennas) in AP 100. Similarly, packets may be received from the one or more other physical instances of electronic devices via physical layer 114 and Wi-Fi interface 112. Moreover, Ethernet interface 110 may add information to these received packets in additional packets that are compatible with Ethernet, which are communicated using physical layer 108 and the link to the network. Additional communications may be generated by the AP 100 itself for communication via physical layer 114 (such as control or management frames).

During selected situations, such as testing, RFAL 116 and the switch (which could be implemented in hardware or software) may be activated, and the portion(s) of physical layer 114 associated with wireless communication (such as Wi-Fi interface 112) may be disabled or decoupled (or, in the example of a virtual AP, no actual physical layer is present). RFAL 116 may take frames that are compatible with an IEEE 802.11 standard and may include or encapsulate these frames with an added RFAL header in packets that are compatible with an IEEE 802.3 standard. Then, these packets are provided to the bridge and communicated to physical or virtual instances of the one or more other electronic devices via Ethernet interface 110 and physical layer 108 (instead of using wireless communication) or any other destination. Similarly, frames including RFAL headers received from the one or more other physical or virtual instances of the electronic devices via Ethernet may be provided by the bridge to RFAL 116 and then de-encapsulated by RFAL 116. Next, the de-encapsulated frames may be provided to Wi-Fi interface 112, processed in accordance with the RFAL header information. Alternatively, the de-encapsulated frames may be communicated in Wi-Fi-compatible frames via physical layer 114.

Figure 2:
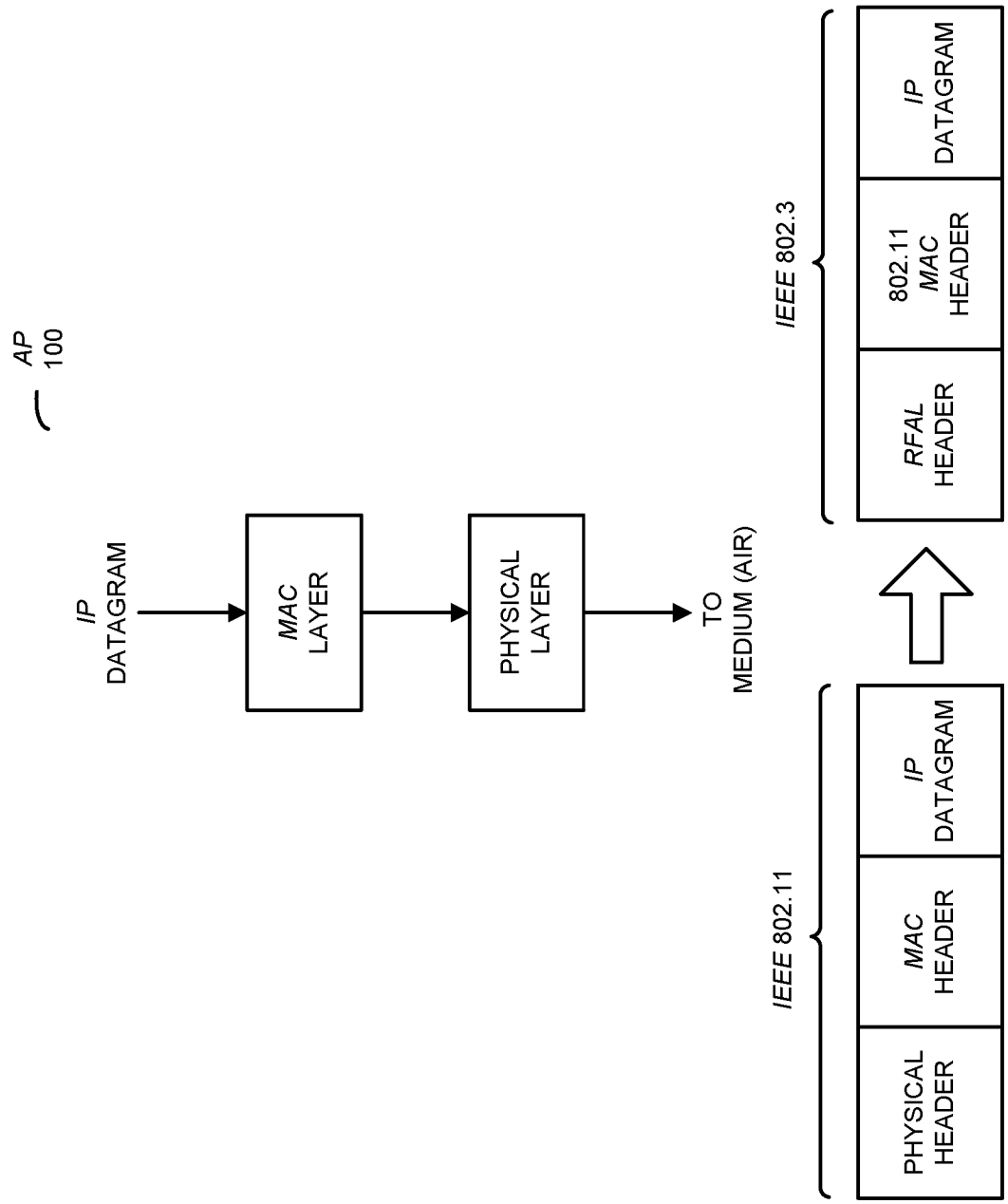
FIG. 2 is a drawing illustrating operation of the AP in FIG. 1 in accordance with embodiments of the present disclosure.

This process is further illustrated in FIG. 2, which presents a drawing illustrating operation of AP 100 in accordance with some embodiments. In particular, an IEEE 802.11 packet (which is to be communicated to the one or more other physical or virtual instances of the electronic devices) may be encapsulated or included in an IEEE 802.3 frame. As described further below with reference to FIG. 7, encapsulating the IEEE 802.11 packet may involve replacing at least a portion of a physical layer (IEEE 802.11) header with the RFAL header, so that the frame can be communicated in a frame over a wired Ethernet connection to the intended destination.

Figure 3:
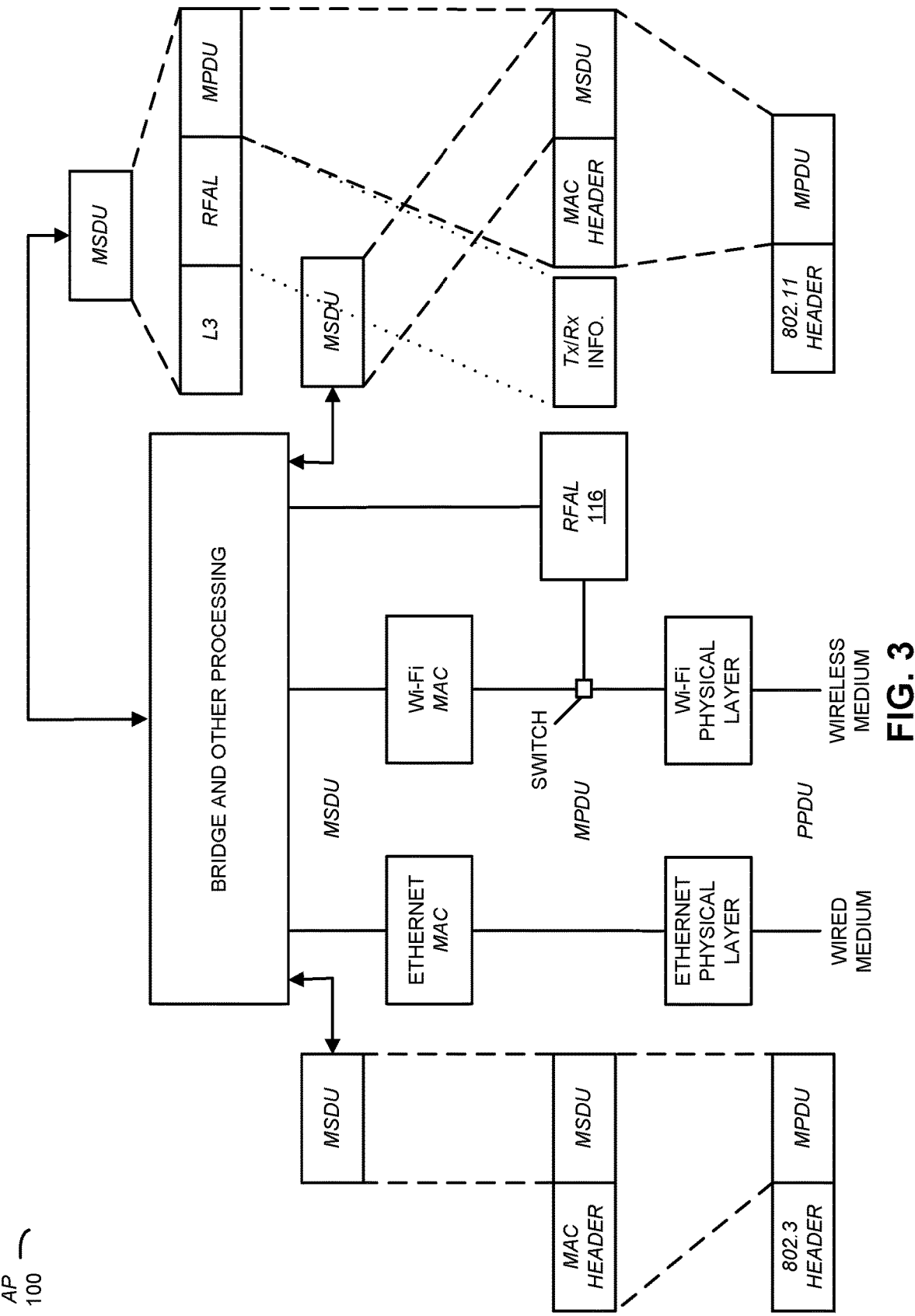
FIG. 3 is a drawing illustrating operation of the AP in FIG. 1 in accordance with embodiments of the present disclosure.

FIG. 3 presents a drawing illustrating a functional operation of AP 100 in accordance with some embodiments. In particular, all or some of RFAL 116 may be included in a data-link-layer driver and in the MAC layer (such as above or prior to the physical packet data unit in the physical service data unit or PSDU, which is henceforth referred to as the MAC protocol data unit or MPDU). When the switch and RFAL 116 are activated, instead of being communicated via Wi-Fi using the wireless medium, RFAL 116 may take a frame (such as a MAC management protocol data unit or MMPDU, or a MAC protocol data unit or MPDU), and include the RFAL header, the layer 3 addressing information (e.g., an IP header) and a radio-frequency header information or tag as an encapsulated frame in an Ethernet-compatible packet. This tag may include information characterizing the transmission of the MPDU through a simulated radio-frequency environment of AP 100, so that RFAL 116 can simulate operation of a radio within a modeled environment. Note that the information in the tags may include information specifying a number of different parameters which can affect transmissions such as loss during the simulated wireless communication (which may be based on a cumulative distance function with the predefined variation in loss as a function of the actual or simulated separation between AP 100 and the one or more other physical or virtual instances of the electronic devices), an error rate during the simulated wireless communication (which may be based on the predefined variation in the packet error rate or PER as a function of a received signal strength indicator or RSSI), or other items as described below. In simulating wireless communications, e.g., a virtual building may be modeled. The building can (virtually) exist at specific virtual geospatial coordinates (latitude, longitude and altitude or one or more floors). The virtual building can have walls (floor-to-ceiling height or partial height, such as for cubicles), ceilings and floors. These walls, ceilings and floors may be (virtually) constructed of different virtual building materials (which may provide different amounts of attenuation when radio-frequency signals pass through them). These building features may determine the simulated radio environment and, thus, may determine the simulated pathloss between a vAP and vUE. The simulated pathloss, in conjunction with the transmitter power (which may also be a parameter in the RFAL header) in turn may determine (after passing through the simulated radio-frequency environment) resulting values of parameters in the RFAL header, such as RSSI and a signal-to-noise ratio (SNR). The values of SNR, optionally in conjunction with the aforementioned PER, may facilitate selectively (and realistically) dropping IEEE 802.11 data frames or control frames (e.g., an acknowledgment). Note that the absence of these frames (e.g., a missing acknowledgment) is typically used by a Wi-Fi to choose the PHY rate (which is sometimes referred to as the 'modulation and coding scheme rate' or 'MCS rate') for transmission of subsequent frames. In the context of RFAL 116, missing frames can be used by the Wi-Fi driver to choose a virtual PHY rate.

In this virtual building, vAPs may be placed around the building at specific coordinates. Similarly, vUEs may be placed around the building at specific coordinates. In addition, some or all of the vUEs may be put into simulated motion so that the pathloss between a vUE and vAPs is time varying. In this way, vUEs, which emulate physical or real UEs, may be influenced to transition from vAP to vAP as the vUE moves throughout the virtual building.

In addition, in this virtual building, the radio-frequency environment may be further simulated using ray-tracing techniques. Ray tracing is well-known to those skilled in the art. Using ray tracing, virtually transmitted radio waves originating from a specific three-dimensional coordinate (latitude, longitude, floor number) can be made to virtually bounce off building features, thereby simulating a fading environment at a receiver located at a specific three-dimensional coordinate. Furthermore, the three-dimensional antenna patterns of both the transmitter and receiver can be modeled. Using ray tracing (or related techniques), the angle-of-arrival (AOA) of radio-frequency signals can be modeled and the resulting parameters of this model can be communicated to a Wi-Fi driver via the RFAL header. For example, the AOA may be used when the wireless system is used for vUE location determination.

Those skilled in the art will recognize that the degree to which a radio-frequency environment is modeled may be based on the needs of a particular testing scenario. Not all testing scenarios require the same level of detailed modeling. Nevertheless, in a cloud-scale testing environment (which can include tens of thousands of servers), enough servers may be allocated to test at web-scale (in terms of the number of vAPs and vUEs) while modeling the radio-frequency environment in great detail.

Note that well-established channel models, such as those developed for IEEE 802.16 can be incorporated into the model of the radio-frequency environment in order to test varying indoor and outdoor environments.

In addition, note that RFAL 116 may add layer 3 (L3) addressing information (e.g., IP addresses) so that the frame, which may be communicated via IEEE 802.3, can reach a desired destination (which may be remotely located, such as an originating or receiving vAP that is outside the level 2 subnet of a vAP or a real AP under test), and to identify the frame as a 'RFAL' frame (so that is appropriately processed RFAL at the destination). Then, the encapsulated frame may be provided to the bridge and subsequently communicated via Ethernet using the wired medium. Similarly, packets with encapsulated IEEE 802.11 frames that are received via the Ethernet may be provided by the bridge to RFAL 116 and de-encapsulated, and the de-encapsulated frames may be subsequently communicated in additional packets via Ethernet using the wired medium (resulting in a simulated received frame) or via Wi-Fi using the wireless medium. Note that the operations of AP 100 shown in FIG. 3 can be implemented in software, so that AP 100 can be virtualized. With the exception of portion(s) of physical layer 114 associated with wireless communication (which are mimicked by RFAL 116), the function of the software is the same as that during normal operation of AP 100.

Therefore, in a physical AP non-RFAL frames intended to be transmitted may be received from the wired medium via the Ethernet physical layer and may be processed by the Ethernet MAC. After passing through the bridge (and undergoing relevant other processing), the frame is processed by the Wi-Fi MAC and the Wi-Fi physical layer, and is transmitted in the wireless medium. Note that the Wi-Fi MAC may provide transmit (Tx) information or settings for the Wi-Fi physical layer (such as the modulation and coding scheme, the radio-frequency channel bandwidth, the data rate, etc.), which tell the Wi-Fi physical layer how to send the frame. (This Tx information is not added to the frame, so its placement illustrated using the fine dashed lines in FIG. 3.)

Similarly, frames received form the wireless medium (i.e., non-RFAL inbound frames) may be received from the wireless medium via the Wi-Fi physical layer and may be processed by the Wi-Fi MAC. Note that the Wi-Fi physical may provide (Rx) information or settings to the Wi-Fi MAC (such as the modulation and coding scheme, the radio-frequency channel bandwidth, the data rate, the received signal strength, etc.), which tell the Wi-Fi MAC information used to process the frame. After passing through the bridge (and undergoing other relevant processing), the frame is processed by the Ethernet MAC and the Ethernet physical layer, and is transmitted in the wired medium.

However, frames intended to be 'transmitted' by the AP when RFAL is activated may be received from the wired medium via the Ethernet physical layer and may be processed by the Ethernet MAC. After passing through the bridge (and undergoing other relevant processing), the frame is processed by the Wi-Fi MAC and RFAL 116 (including adding the RFAL header, the tag information and/or L3 addressing information) and passed to the bridge. After passing through the bridge, the frame is processed by the Ethernet MAC and the Ethernet physical layer, and is transmitted in the wired medium. As noted previously, the L3 addressing information (such as an IP protocol header) may be added so the frame can reach (via the wired medium) the desired destination and may be processed as a RFAL frame (e.g., the IP address may specify RFAL in the destination device). Therefore, RFAL may involve, at least in part, a L3 process. In addition, the tag may include information that allows the frame to be appropriately processed by the destination device. In particular, the tag may be added so that it appears to the destination device as though the frame has been received by the Wi-Fi physical layer (even though it was received via Ethernet). Thus, the tag may include information the receiver in the Wi-Fi physical layer would provide to the Wi-Fi MAC if the frame had been received as a signal via an antenna. For example, as described further below with reference to FIG. 4, the tag may include information that characterizes transmission of the frame through a modeled radio-frequency environment, such as: receive parameters, electrical characteristics, path-loss, attenuation, data rate, throughput, a phase angle of arrival, etc. While FIG. 3 illustrates the tag being added in AP 100, in other embodiments the tag 'information' may be added or generated by RFAL at the destination device after the frame has been received, and before further processing of the frame by the Wi-Fi MAC. In some embodiments, the use of the tag information allows remote testing of a customer deployment, such as by using so-called 'injection,' which is described further below.

Similarly, RFAL 'inbound' frames may be received from the wired medium (as opposed to the wireless medium) via the Ethernet physical layer and may be processed by the Ethernet MAC. After passing through the bridge (and undergoing relevant other processing), the frame is directed to RFAL 116 based on the L3 addressing information, and the frame is processed by RFAL 116. During this processing, RFAL 116 provides the simulated Rx information or settings in the tag to the Wi-Fi MAC. Then, the frame is processed by the Wi-Fi MAC in accordance with the Rx information, passes back through bridge, is processed by the Ethernet MAC and the Ethernet physical layer, and is transmitted in the wired medium. As noted previously, instead of using tag information in the frame, in some embodiments RFAL 116 may generate, determine or add this information before further processing of the frame by the Wi-Fi MAC. Thus, the modeling of the radio-frequency environment may occur at the source (such as AP 100) or the destination device.

In some embodiments, RFAL 116 can be used for so-called 'injection.' In particular, RFAL 116 may have an additional mode of operation to those described above. In this other mode of operation, a RFAL frame (which includes information specifying the other mode of operation) is received from another AP via the wired medium. After processing by the Ethernet physical layer and the Ethernet MAC, and passing through the bridge (and undergoing relevant other processing), the frame is directed to RFAL 116 based on the L3 addressing information. The frame is processed by RFAL 116, which uses the tag information in the frame or generates the tag information and then provides transmit Tx information or settings to the Wi-Fi physical layer based on the tag information. Next, the frame is transmitted on the wireless medium by the Wi-Fi physical layer. This mode of operation may allow a remotely located AP to test functioning of a customer deployment (which includes AP 100) without the remotely located AP to be within wireless communication range of AP 100 (or even being anywhere near AP 100) or the use of specialized test equipment at the customer deployment. Therefore, the other mode of operation of RFAL may allow frames with certain characteristics (via the tag information) to be injected to AP 100 from a remote location (which, in principle, may be as far away as the other side of the planet), but to allow these frames to appear as if they had been received by AP 100 from a vUE in the customer deployment (i.e., in the same radio-frequency environment).

In an exemplary embodiment, during normal operation, the MSDU may include the information to transmit over the wireless medium using the Wi-Fi interface, MPDU includes the MAC header plus the MSDU, and the PPDU includes a header (IEEE 802.11) plus the MPDU. When RFAL 116 is activated, the preceding MPDU is made into the MSDU* for an MPDU* for Ethernet physical layer. In these embodiments, the MSDU* includes the RFAL header plus the MPDU, the MPDU* includes the MAC Header plus the MSDU*, and a PPDU* includes the header (IEEE 802.3) plus the MPDU*.

In these ways, RFAL 116 can be used to encapsulate an IEEE 802.11 (or LTE) MPDU into a MPDU for IEEE 802.3 without regard to a type of the MPDU. (Thus, RFAL may be applied to IEEE 802.11 control, data and/or management frames, which may be specified by bits in a frame header.) In particular, RFAL 116 may encapsulate control and/or management frames, not just data frames. Similarly, RFAL 116 can receive an encapsulated IEEE 802.11 (or LTE) MPDU in an IEEE 802.3 MPDU. Moreover, RFAL 116 may de-encapsulate the IEEE 802.11 MPDU and then may process it according to RFAL header. Furthermore, in some embodiments RFAL 116 may de-encapsulate the IEEE 802.11 MPDU and then may transmit it over a physical layer in AP 100. These capabilities may facilitate a wide variety of testing and operating scenarios, including off-premises traffic generation, such as providing the MPDU in a frame to a location outside of the radio-frequency range of AP 100 or receiving the MPDU in a frame from a location outside of the radio-frequency range of AP 100.

While the preceding discussion illustrated the application of RFAL to IEEE 802.11, note, once again, that this technique may be applied to other communication protocols, such as LTE. Persons of ordinary skill in the art will readily recognize how the concepts described herein can be applied to LTE or any wireless protocol to simulate transmission over the wireless medium.

Figure 4:
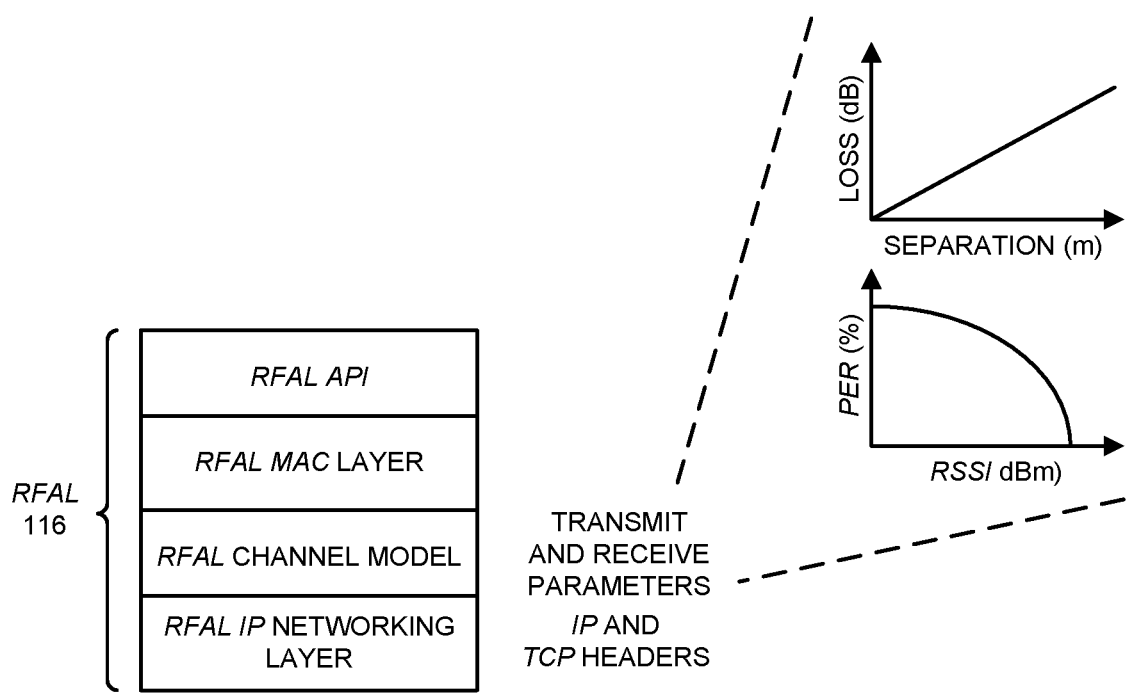
FIG. 4 is a drawing illustrating a radio-frequency abstraction layer (RFAL) in the AP of FIG. 1 in accordance with embodiments of the present disclosure.

Non-limiting exemplary software layers in RFAL are illustrated in FIG. 4, which presents a drawing illustrating RFAL 116 in AP 100 (FIGS. 1-3) in accordance with some embodiments. In particular, RFAL 116 can include a RFAL application programming interface or API (which can be called during testing and/or addressed via the L3 information), a RFAL MAC layer (which use the information for certain processing, including transmission or receive parameters, as well as parameters such as the modulation coding scheme), a RFAL channel model (which modifies the information from the RFAL MAC layer, thereby simulating radio propagation, such as estimated or simulated pathloss), and a RFAL IP networking layer. Note that the simulated pathloss may be related to a specific geo-spatial environment. For example, the simulated pathloss may be for a known environment (such as by know or adding the effect of a 'wall' based on a particular location) to simulate the impact on operation of an AP. Thus, the geo-spatial environment may include geographic coordinates of the AP and the environment. The coordinates may be stationary or, for devices, may be time variant. This capability may allow RFAL to model the radio-frequency environment of the environment (which may allow optimization of the number of APs, their placement and their configuration based on the details of the environment) and/or to model location-based services in the environment. Operation of RFAL 116 is described further below.

Figure 5:
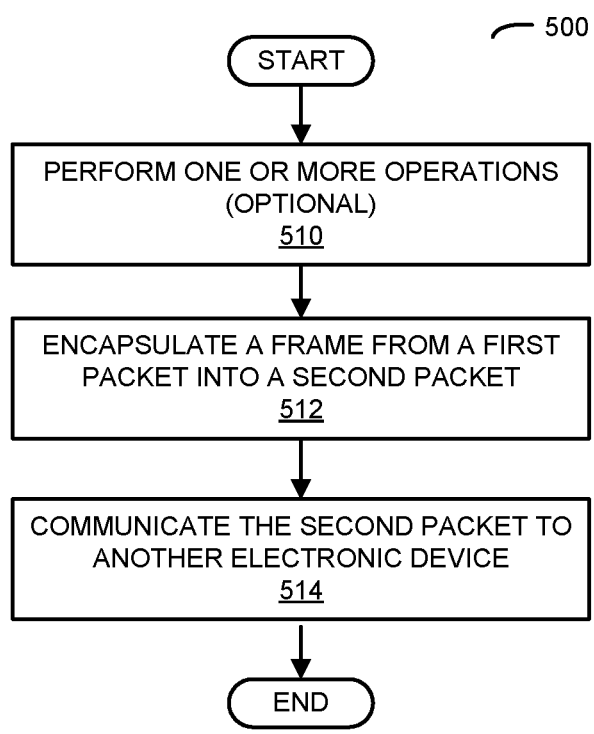
FIG. 5 is a flow diagram illustrating a method for performing testing of an AP in accordance with embodiments of the present disclosure.

We now describe embodiments of a testing technique. FIG. 5 presents a flow diagram illustrating a method 500 for performing testing of an AP, such as AP 100 in FIGS. 1-3 or one of vAPs 810 in FIG. 8, in accordance with some embodiments. During operation, the AP (such as a processor in the AP executing a program module, e.g., RFAL) encapsulates a frame in a first packet that is compatible with a WLAN communication protocol (such as one compatible with an IEEE 802.11 standard) into a second packet that is compatible with a network communication protocol (operation 512), such as Ethernet.

Then, the AP communicates, via a network interface circuit, the second packet to another electronic device (operation 514), such as a portable electronic device and/or a WLAN controller. (As noted previously, the other electronic device may be a physical instance or a virtual instance.) Note that the communication may occur without radio-frequency communication. For example, the AP may include an antenna and a WLAN interface circuit that communicates with one or more other electronic devices. Thus, the communication with the other electronic device during method 500 may occur without using the WLAN interface circuit and the antenna. In particular, the AP may disable or decouple the WLAN interface circuit and the antenna during the communication. In the case of a vAP, of course, there would be no antenna for radio-frequency communications.

In some embodiments, the AP optionally performs one or more operations (operation 510) prior to the encapsulation (operation 512). For example, the AP may generate the frame (i.e., the frame may originate at the AP, including such examples as control or management frames). Alternatively or additionally, the AP may receive, via the WLAN interface circuit, the frame in a third packet from a portable electronic device prior to the encapsulation (operation 512), which may occur in embodiments where the AP receives the frame from another device instead of generating the frame.

Furthermore, during the encapsulation (operation 512) and/or the communication (operation 514), the AP may add a tag to the second packet. This tag may include information that characterizes transmission of the frame through a simulated radio-frequency environment. Similarly, packets received from the other electronic device by the AP may include tags that include additional information that characterizes reception of the frame as if the frame had passed through the simulated radio-frequency environment. Additionally, the additional information may include state-machine information associated with an application executed on the other electronic device. As described above, instead of receiving information about the frame transmission through the modeled radio-frequency environment along with the frame, RFAL can use intended transmit information received along with the frame, and then use this information to 'transmit' the frame through the modeled radio-frequency environment on the AP. In other words, the effects of the radio-frequency model as applied to the intended frame transmission could occur in the 'transmitting,' 'receiving,' or a centralized modeling unit, or any combination of the three.

Figure 6:
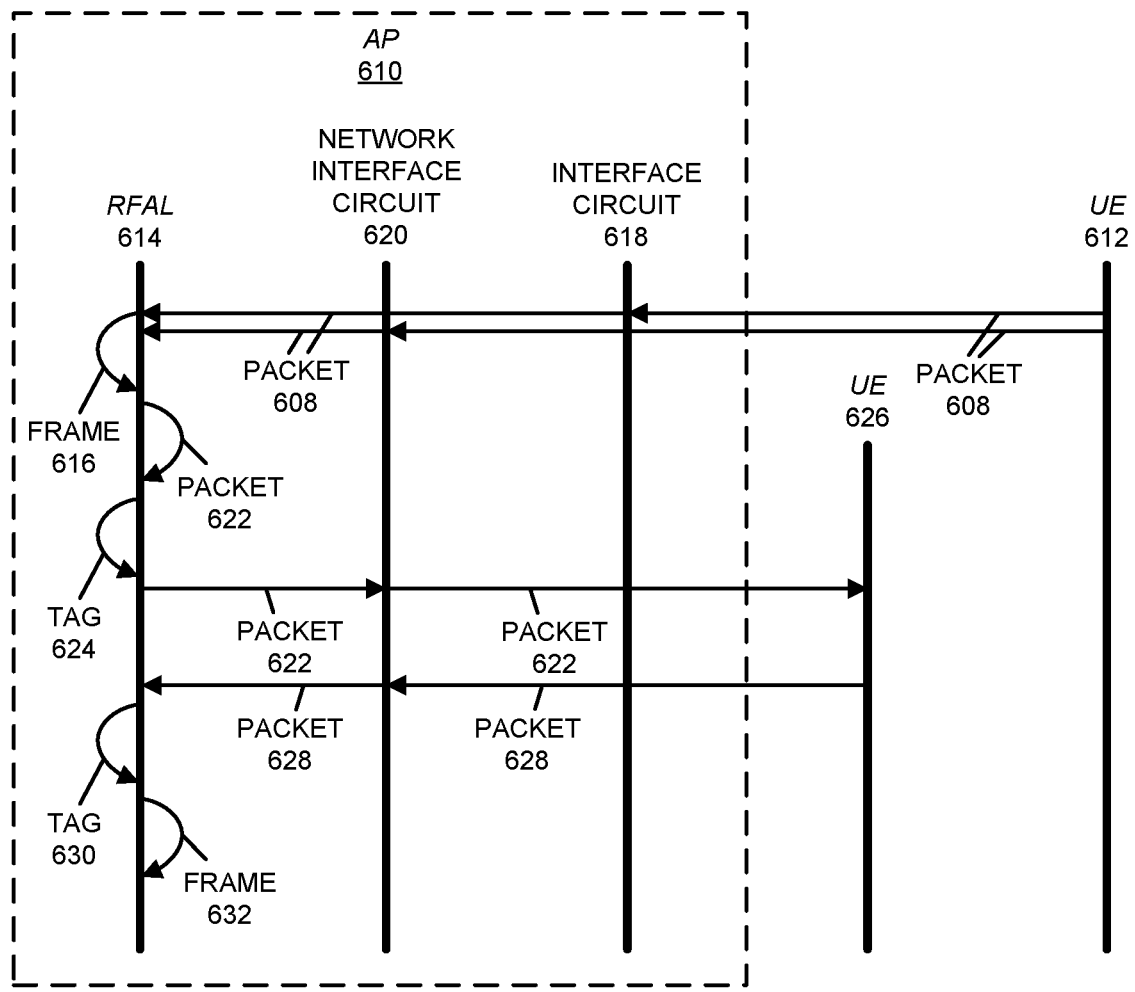
FIG. 6 is a drawing illustrating communication among electronic devices in accordance with embodiments of the present disclosure.

Some embodiments of the communication technique are further illustrated in FIG. 6, which presents a drawing illustrating communication among AP 610, and UEs 612 and 626 (such as a vAP and one or more vUEs) in accordance with some embodiments of method 500. In particular, RFAL 614 may generate a frame 616. Alternatively or additionally, interface circuit 618 and/or network interface circuit 620 may receive frame 616 in a packet 608 from UE 612 intended for UE 626. (Note that the communication of packet 608 does not pass through UE 626.) This frame may be provided to RFAL 614.

Then, RFAL 614 encapsulates frame 616 from packet 608 (which is compatible with an IEEE 802.11 standard) to packet 622 (which is compatible with IP). Moreover, RFAL 614 may optionally add tag 624 with information specifying transmission of packet 622 through a simulated radio-frequency environment of AP 610 to packet 622. Next, RFAL 614 provides packet 622 to network interface circuit 620, which communicates packet 622 via an Ethernet link to UE 626.

Subsequently, network interface circuit 620 may receive packet 628 from UE 626, which provides packet 628 to RFAL 614. RFAL 614 may optionally extract tag 630 with information that characterizes transmission of the packet 628 through a simulated radio-frequency environment between AP 610 and UE 626. Optionally, state-machine information for one or more applications executing on UE 626 may be included.

Next, RFAL 614 de-encapsulates frame 632 from packet 628. Afterwards, frame 632 may be further processed by processing subsystem 1010 (FIG. 10) in accordance with the tag information.

In this way, AP 610 may facilitate virtual testing or testing at a customer location of a WLAN and associated UEs 612 and 626.

In some embodiments of method 500 in FIGS. 5 and 6, there may be additional or fewer operations. Additionally, the order of the operations in method 500 in FIGS. 5 and 6 may be changed, and/or two or more operations may be combined into a single operation.

In an exemplary embodiment, in order for RFAL to simulate a radio-frequency environment using IP networking functionality, RFAL may need to support frame 'transmission.' From the perspective of a vUE (which is used as an illustrative example), when the vUE needs to transmit an IEEE 802.11 frame, RFAL encapsulates this frame (an MMPDU or an MPDU) into a packet with an IP datagram and forwards it to a destination IP address. When RFAL does this, the IP source address used in the datagram is its own IP address (i.e., the IP address of the server hosting the vUE). When a server receives an IP datagram, RFAL in the server de-encapsulates the IEEE 802.11 frame, parses the IEEE 802.11 destination MAC address from the IEEE 802.11 header and, using this MAC address, forwards it to the correct vAP (which is used as an illustration), i.e., the correct vAP in the set of vAPs that the server is hosting. Whenever RFAL in a vAP receives an IP datagram, it saves (i.e., caches) the source IP address so that when it needs to send a frame back to the originating vUE, it knows where to send it.

RFAL may need to support two kinds of 'transmission:' unicast transmission and broadcast/multicast (i.e., group-addressed frame) transmission. When a vUE or vAP needs to send an IEEE 802.11 unicast frame, RFAL encapsulates that frame with an IP datagram and unicasts it towards it destination (how RFAL knows the destination IP address is described below). When a real UE or an AP needs to send a broadcast frame (e.g., for a UE, a probe request frame to the wildcard basic service set identifier or BSSID or, for an AP, a Beacon frame), the UE/AP may transmit that frame on a specific radio channel, without really knowing whether any receiver will receive it. An RFAL network may define a set of IP multicast groups, with each group address corresponding to a single radio-frequency channel. A receiver that joins this IP multicast group may be able to 'receive' transmissions corresponding to that radio channel. Therefore, when a vUE or a vAP needs to send a broadcast frame, it may encapsulate that IEEE 802.11 frame in a packet with an IP datagram and may transmit it to a multicast group address. When vAPs are initialized (after the server they are hosted on completes its boot-up process), they may be configured to operate on a specific radio-frequency channel. Thus, after boot-up, they may join the corresponding multicast group.

Moreover, RFAL networking may take advantage of the IEEE 802.11 network discovery process in a UE to learn the IP addresses needed for routing. When a UE (or, in this case, a vUE) is attempting to discover an AP (or, in this case, a vAP), it may tune its radio to a specific radio-frequency channel and may transmit a wildcard probe request frame. A wildcard probe request frame may be sent to the (destination) broadcast MAC address and may have a wildcard service set identification (SSID) as its payload (the wildcard SSID means that an AP will respond with a probe response frame regardless of its own SSID value). RFAL in the server hosting the vUE may then encapsulate the wildcard probe request frame into a packet with an IP datagram and may transmit it to the corresponding multicast group address. Servers that have joined that multicast group may receive the frame and their RFAL may forward it to other vAPs operating on that radio-frequency channel. As described previously, RFAL may cache the source IP address of the frames it receives so it knows where to send replies.

In an exemplary embodiment, RFAL performs the functions of: caching the BSSID (e.g., virtual machine IP address bindings by snooping on beacon, probe request and probe response frames); caching serving BSSID via snooping on (re-)association response frames; routing unicast AP/station (such as from a portable electronic device) transmissions point-to-point between virtual machines; optimizing network traffic and virtual machine loading by forwarding relevant frames to/from a serving AP; routing broadcast and multicast AP/station transmissions via multicast IP; supporting network discovery and scanning functions of a station; and/or supporting radio-frequency neighbor discovery functions of an AP.

Note that, during the testing, a vUE or UE may perform: network discovery and scanning as usual; active scanning using wildcard SSID and/or wildcard BSSID; and/or discovery via passive scanning.

During the sequence for a station to associate to an AP, the station and the AP virtual machines may join multicast groups. The AP s may use a configured radio-frequency channel and venue to construct a group address for beaconing. Moreover, the station may join the multicast group of the AP after joining the BSS (to receive beacons for power-save operation). The station that wants to perform passive scanning may join the multicast groups after the start of a test case (in order to receive beacon frames). Furthermore, the AP s may transmit broadcast frames for a few seconds so that multicast trees form in the IP network. Then, the AP s may beacon on their radio-frequency channel, and RFAL in turn may transmit to the multicast group address.

Next, the station may transmit a probe request on the radio-frequency channel, and RFAL in turn may transmit to the multicast group address. RFAL may use the venue identifier to (partially) construct group addresses for use in scanning. Moreover, the AP may transmit a probe response on the radio-frequency channel, and RFAL in turn may transmit to the unicast IP address of the virtual machine of the station. Note that the station RFAL application-programming-interface layer may learn the binding between the BSSID of the AP and the IP address of the AP virtual machine.

Furthermore, the station may repeat the probe exchange on any radio-frequency channel(s) according to its network-discovery technique. The station may select an AP to join and may transmit an association request message. In turn, RFAL may encapsulate the message in a packet and may forward it to the selected IP address of the virtual machine of the AP. Then, the AP may transmit back an association response message. In response, RFAL may encapsulate this message in a packet and may forward it to the selected IP address of the virtual machine of the station. The station may use the Dynamic Host Configuration Protocol (DHCP) to get the IP address, and the traffic generator in the station may fire.

RFAL may be designed so that: a separate multicast group address is used for each {venue, radio-frequency channel} duple; AP/station transmission 'coverage' is constrained by multicast group membership; AP/station transmission 'coverage' is constrained to be within a virtual venue; and/or AP/station transmission 'coverage' is constrained to be within a 'radio-frequency channel.' Typically, the transmission range of an AP is limited to about 100 m, depending on radio propagation conditions and other factors. This has the practical effect of limiting the number of UEs whose transmissions can be received by an AP and vice versa. It can be beneficial to have a similar mechanism(s) in a virtual environment. RFAL networking may employ two mechanisms in this regard. The first is the concept of a venue. In particular, Wi-Fi networks are often deployed inside a building/venue and the Wi-Fi network is optimized for in-building coverage. Radio signals usually propagate outside the walls of the building, but usually not too far. In RFAL networking, this concept may be embodied by adding a venue identifier to the multicast group. When vAPs (or vUEs) are initialized, they may be assigned a venue identifier and may only join multicast groups used for the assigned {venue, radio-frequency channel} duple. Therefore, the switches and routers connecting vUE and vAP servers may not have to forward multicast datagrams to too many destinations. This feature of RFAL may be useful because, by definition, multicast forwarding involves packet replication. In particular, one multicast packet can be replicated by switches and routers to produce many packets. If there is too much replication, it can affect the scalability of the system and, thus, the number of vUE and vAP servers that can ultimately be inter-connected. Therefore, constraining multicast by using the {venue, radio-frequency channel} duple may enable very large-scale testing.

A second concept use to constrain the extent of vUE/vAP transmission is virtual distance. As described previously and further below, RFAL may incorporate in a RFAL header the geospatial coordinates of the transmitter. The receiving RFAL may know the geospatial location of the receiver (be it a UE, a vUE, an AP or a vAP). By computing the distance (or a pathloss based on a radio-frequency propagation model appropriate for the simulated venue) between a vUE and a vAP, RFAL can drop any frames that 'propagate' beyond a certain distance or have pathloss greater than a certain threshold value.

RFAL may keep AP-to-station transmissions separate from station-to-AP transmissions using two different group addresses (one for each direction). Alternatively, RFAL may join them together using a common group address (which may be configuration-dependent).

Moreover, the multicast group addresses in RFAL may have a prefix with: venue identifier-highByte.venue identifier-lowByte.{radio-frequency channel, [AP/station bit]}. Note that the AP/station bit may be equal to '0' for an AP and equal to '1' for a station. This approach may be used (with a configuration option) to separate AP and station broadcast and multicast transmissions. For example, the multicast IP address, '239.0.21.3,' may indicate a venue identifier of 21, a radio-frequency channel of 1 and station transmission.

Furthermore, in terms of the use of IEEE 802.11 control frames, RFAL interface may 'handle' a control frame used by the IEEE 802.11 MAC layer. These control frames may be locally handled by RFAL, including: acknowledge (ACK), request to send (RTS) and/or clear to send (CTS). The network interface card (or network interface circuit) Ethernet and IP layers may be lossless' by using Transmission Control Protocol (TCP) as the transport protocol. ACK, RTS, CTS may also be forwarded over the network interface card. In this case, the network interface card Ethernet and IP layers may be 'lossy,' e.g., by using a wide area network emulator test box to introduce dropped frames (such as by using User Datagram Protocol or UDP as the transport protocol). Note that RFAL may forward control frames such as: power saving-poll, block ACK, block ACK request, control wrapper, contention free-end, and/or contention free-end plus contention free-ACK.

Figure 7:
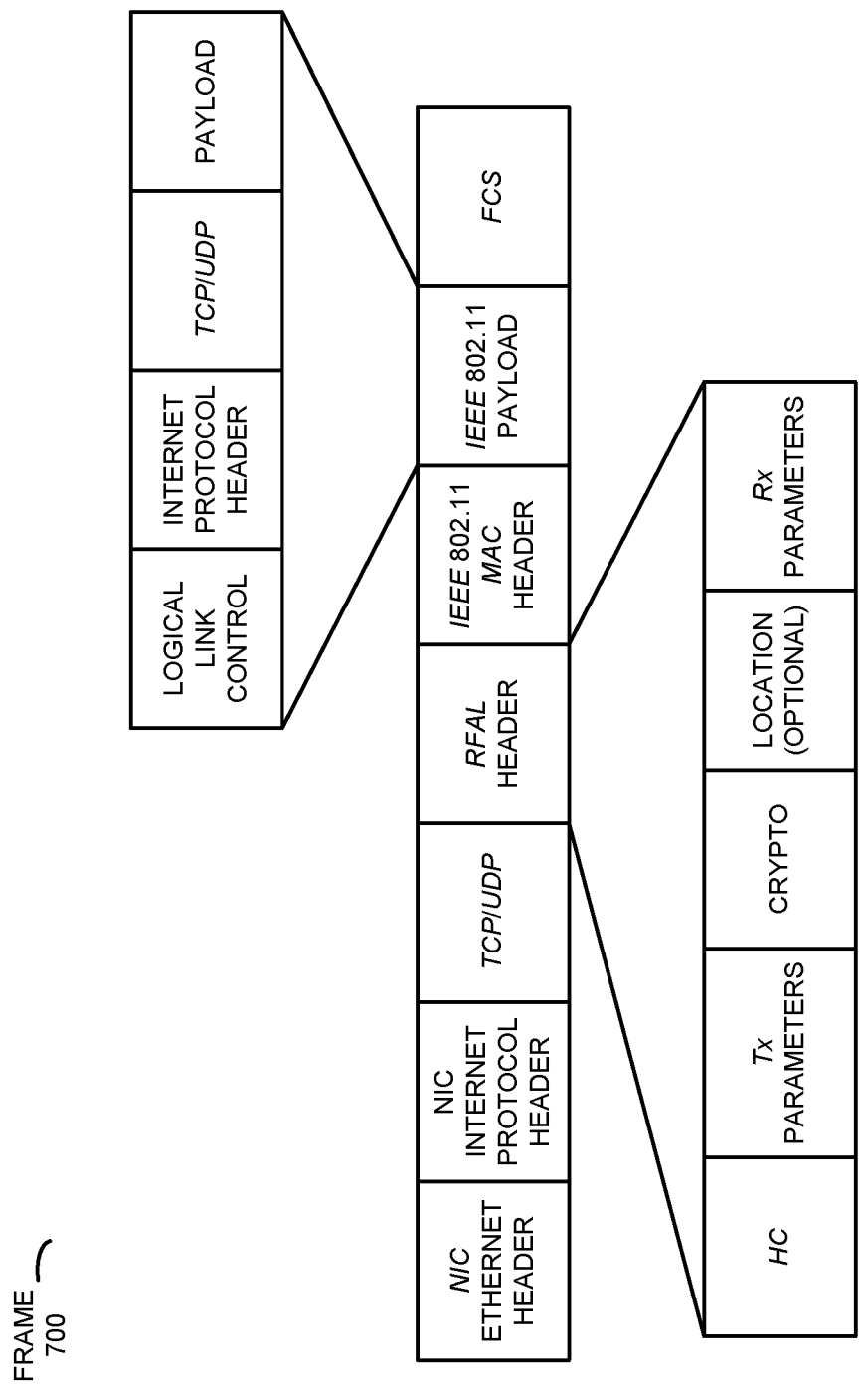
FIG. 7 is a block diagram illustrating a frame communicated via Ethernet in accordance with embodiments of the present disclosure.

FIG. 7 presents a block diagram illustrating a frame 700 communicated via Ethernet in accordance with some embodiments. This frame may encapsulate an IEEE 802.11 frame, and may be output by RFAL. Note that there may not be any changes in frame 700 from a standard IEEE 802.11 MAC frame. In addition, frame check sequence (FCS) may be present because it is part of the IEEE 802.11 MAC trailer. However, it may be set to zero. Also note that different portions of frame 700 may be generated by RFAL, while other portions may be generated by the IEEE 802.3 MAC processor.

The RFAL header may include a header control (HC) field with: the RFAL version, cryptographic control, location control, an aggregate media-access-control-protocol-data-unit (A-MDPU) indicator, and/or request control frames. Moreover, the RFAL header may include transmit (Tx) parameters, such as: the IEEE 802.11 communication protocol (such as a, b, g, n, ac and/or others), the radio-frequency bandwidth (e.g., 20 MHz, 40 MHz, 80 MHz, 80+80 MHz, 160 MHz, etc.), the transmit power level, the transmit modulation and coding schemes (MCS), and/or the TxVector. Furthermore, the RFAL header may include a crypto field, which defines cryptographic options that are present. Note that the IEEE 802.11 payload, which typically includes an IP datagram, is usually not encrypted when using RFAL (but it can be). Note that cryptography, which is computationally intensive, is typically performed by Wi-Fi silicon, but in this embodiment it may be performed by software. Other cryptographic options include: pairwise transient key (present or not), group temporal key (present or not) for the IEEE 802.11 data frame, and/or integrity group temporal key (present or not) for the IEEE 802.11 management frame. Additionally, the RFAL header may include optional location information (such as geospatial coordinates: latitude, longitude and altitude/floor number) and/or receive (Rx) parameters such as: the RSSI, a signal-to-noise ratio (SNR), and/or the thermal or interference noise floor.

Note that a given UE may: obtain its own IP address (using Dynamic Host Configuration Protocol), perform its own MAC address discovery (using Address Resolution Protocol), and perform its own name resolution (using Domain Name System), etc. Moreover, the given UE may have its own instances of application traffic generators.

In general, the idea in the RFAL header fields is to include information similar to TxVector and RxVector in the IEEE 802.11 standards. Because the RFAL header can include the location of the transmitter station, stations may have simulated motion to cause transition to a new AP and/or stations may learn the locations of APs. Moreover, the RFAL header may include receiver parameters (e.g., Rx parameters): a pathloss model may be implemented based on the AP and the station locations; the pathloss model may be used in conjunction with Tx parameters to modify the RSSI and the SNR header fields; and/or variation in the SNR may be used to model/generate physical-layer errors or to not send ACKs; and/or modeling RSSI may drive the calculation of locations of stations by location-based services for very large-scale location-based-services testing.

Note that the following fields may be consumed by the RFAL API: venue identifier (with, e.g., 16 bits and 64 k possible venues), which may be used to configure the station and may be used to form the multicast group address; the radio-frequency channel (the RFAL API may convert the channel number to a logical channel number, and then may use this to form the multicast group address); and/or the AP/station bit, which can be used to form the multicast group address.

Figure 8:
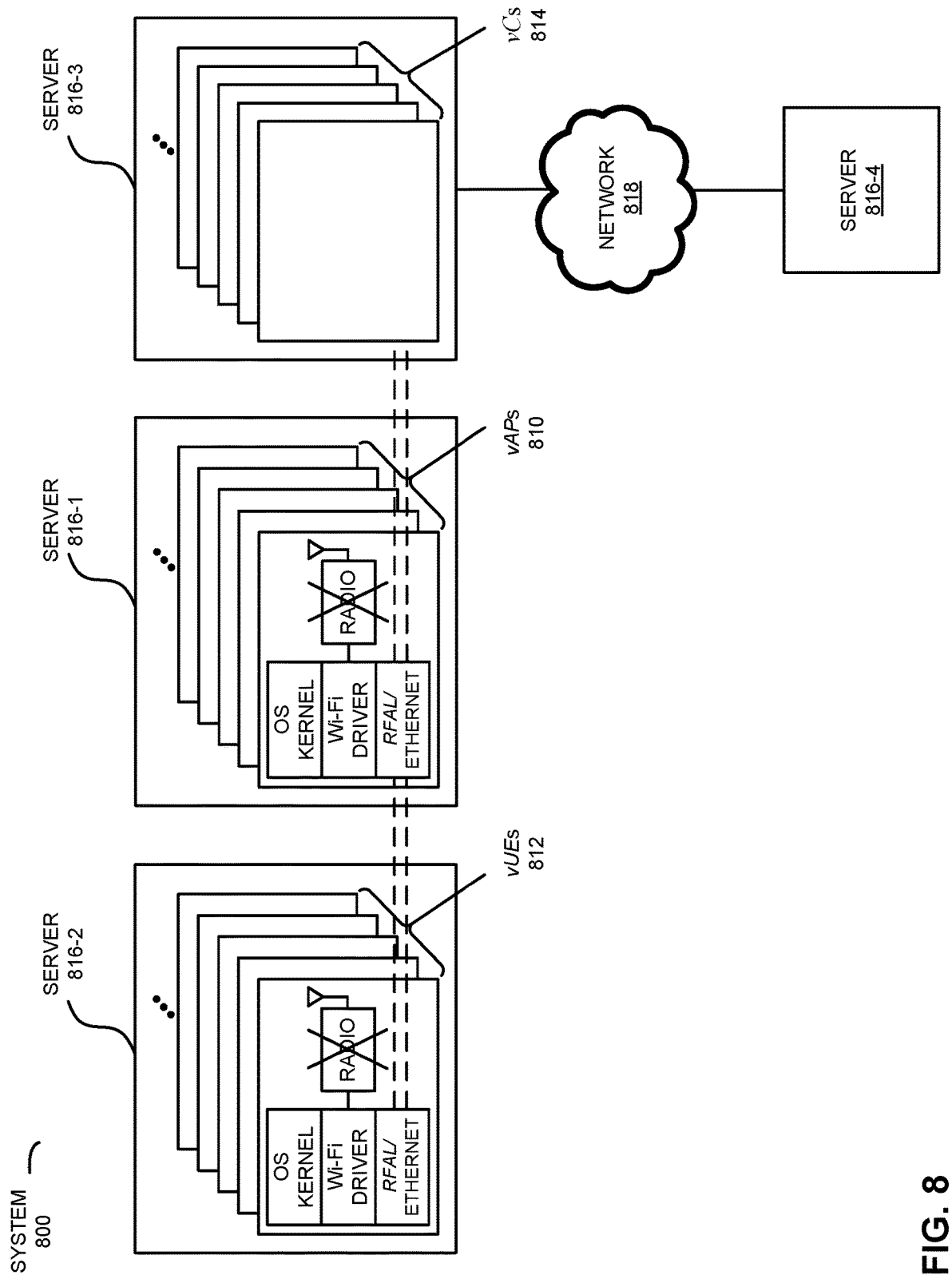
FIG. 8 is a block diagram illustrating end-to-end testing of a system in accordance with embodiments of the present disclosure.

We now describe testing of a system using virtual instances of electronic devices that include RFAL. FIG. 8 presents a block diagram illustrating end-to-end testing of a system 800 in accordance with some embodiments. In this system, one or more vAPs 810 communicate with one or more vUEs 812 and/or with one or more virtual WLAN controllers (vCs) 814. This communication is illustrated by the straight dashed lines in FIG. 8. Note that a physical instance of an 'AP' is an electronic device that allows wireless electronic devices to connect to a wired network (such as the Internet) using wireless communication (such as Wi-Fi), and a WLAN controller' handles automatic adjustments to the parameters of an AP, such as radio-frequency power, channels, authentication, and security. In FIG. 8, virtual instances of APs use RFAL to facilitate testing.

Figure 10:
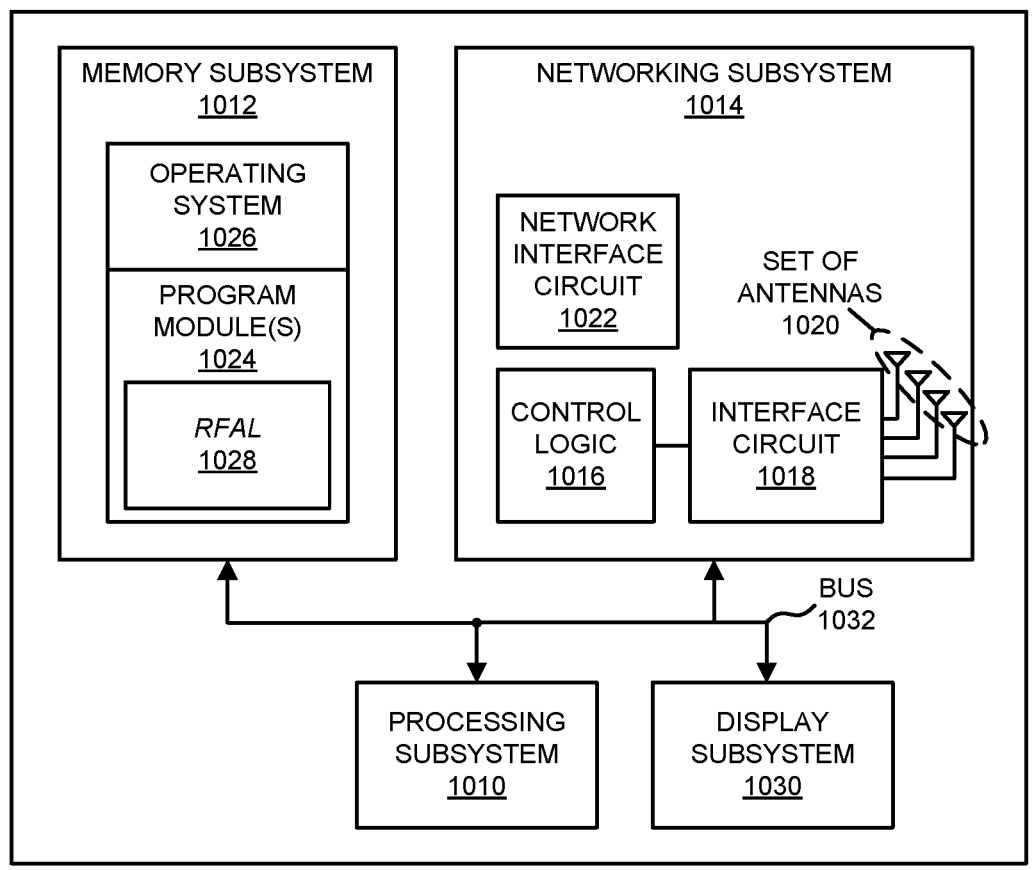
FIG. 10 is a block diagram illustrating an AP in accordance with embodiments of the present disclosure.

As described further below with reference to FIG. 10, the one or more vAPs 810, the one or more vUEs 812 and the one or more vCs 814 may include subsystems, such as a networking subsystem, a memory subsystem and a processor subsystem. More generally, the one or more vAPs 810 and/or the one or more vUEs 812 can include (or can be included within) servers in networking subsystems that enable the one or more vAPs 810 and/or the one or more vUEs 812 to simulate wirelessly communication with each other (e.g., using RFAL and IP networking). In physical instances of electronic devices, wireless communication can comprise transmitting advertisements on wireless channels to enable the physical instances of the electronic devices to make initial contact or detect each other, followed by exchanging subsequent data/management frames (such as probe requests, probe replies, association requests, association responses, etc.) to establish a connection, configure security options (e.g., WPA2-Enterprise), transmit and receive packets or frames via the connection, etc.

However, because of space and complexity, during the testing the one or more vAPs 810, the one or more vUEs 812 and/or the one or more vCs 814 may be placed in a testing mode. Using one of vAPs 810 as an illustration, in this test mode radio-frequency communication is disabled or decoupled, while still allowing the software stack to be tested. In particular, the physical layer and radio channels are decoupled or disabled, but an IEEE 802.11 driver is still used. As described previously with reference to FIGS. 1 and 3, during testing an IEEE 802.11 MAC controller in the data-link layer is used to communicate with an IEEE 802.11 MAC controller in the data-link layer in one or more of vUEs 812 and/or one or more of vCs 814 via a wired network communication protocol, such as: an IEEE 802.3 standard, an Ethernet II standard, and/or a $3^{rd}$ Generation Partnership Project (3GPP) radio protocol. This communication may use RFAL which encapsulates frames compatible with an IEEE 802.11 communication protocol into packets compatible with Ethernet. These packets are then communicated using an Ethernet link. Moreover, at the receiving virtual instance of the electronic device (such as one of vUEs 812), the frames in the packets compatible with Ethernet are de-encapsulated.

Thus, while RFAL replaces the physical layer and the radio channels with networking functions, the remaining software used during normal operation in the one or more vAPs 810 and/or the one or more vUEs 812 (and, thus, the remaining functionality and behaviors of these virtual instances of the electronic devices during normal operation) are unchanged, so the software stack (other than the physical layer) can be quickly and realistically tested. Because the communication uses the MPDU in the IEEE 802.11 MAC layer, the features and capabilities native to IEEE 802.11 MAC layer can be used during the testing, including: the different frame types (e.g., control, management and data frames), their respective information elements, and corresponding semantics/procedures. In addition, capabilities related to managing the radio-frequency environment are available during the testing, such as: AP neighbor discovery, 2.4/5 GHz band balancing, client-load balancing, channel switching (e.g., the IEEE 802.11 channel switch announcement), and/or subscriber management (e.g., traffic statistics accumulations, including the number of bytes and packets transmitted or received by UE). For example, when a vUE joins a BSS, it sends the exact same MMPDUs and MPDUs as UEs do in normal operation. Therefore, the states that are maintained by the physical instance of the electronic device during normal operation are also maintained in the vUE. Consequently, vAPs may receive the same MMPDUs and MPDUs as APs do during normal operation, so that vUE/UE states do not need to be simulated (as they often need to be in existing AP simulators).

Note that RFAL may be implemented as a program or one or more program modules that are executed by processors in the one or more vAPs 810 and/or the one or more vUEs 812. In particular, as described previously with reference to FIG. 3, RFAL may be implemented in a data-link-layer driver (such as an API in an IEEE 802.11 driver) and in upper layers in the software stack.

In order to provide added flexibility, and to reduce the cost and time associated with the testing, vAPs 810, vUEs 812 and/or vCs 814 can be implemented on virtual machines (or Linux containers) on servers 816 (which may or may not be cloud-based) in system 800. Thus, RFAL may provide data-link-layer connectivity among one or more virtual instances of electronic devices (such as vUEs 812), one or more vAPs 810 and/or one or more vCs 814. The number of virtual machines can be increased by testing software in system 800, so that the testing can scale to arbitrary size (e.g., from 1 up to 1000 or more virtual machines). For example, there may be up to 2000 vUEs on server 816-2, and 200 vAPs on server 816-1. Thus, if testing software were to 'spin up' 1000 servers each containing 1000 vUEs, 1,000,000 vUEs would be available for testing purposes. Similarly, testing software could spin up many servers containing vAPs, so that hundreds of thousands of vAPs would be available for testing purposes. In addition, the testing software may configure Ethernet switches and routers to implement the networking components of RFAL.

As discussed previously with reference to FIG. 3, RFAL may add tags to the Ethernet-compatible packets to simulate the radio-frequency environment in system 800. In particular, a transmitter engine and a receiver engine may add tags to and extract tags from the Ethernet-compatible packets with information that characterizes a simulated radio-frequency environment. For example, the tags may include: a RSSI, an SNR, an estimated local noise floor, location or geospatial transaction parameters (such as the geospatial location or coordinates), a transmit power level, a radio-frequency channel, a number of antennas, and/or a modulation technique. However, these parameters are provided as an illustration, and fewer or more parameters characterizing the simulated radio-frequency environment may be included in the tags.

While one of vAPs 810 is used as an illustration in the present discussion, vUEs 812 may include similar hardware and software for implementing RFAL, as well as multiple applications (e.g., Dynamic Host Configuration Protocol, Domain Name System protocol, HTTP/FTP clients, streaming video client, etc.). Because RFAL may support multiple protocols, these protocols and applications can be sequenced through complicated, inter-twined state-machine states during the testing, just as during normal operation. Furthermore, vCs 814 may receive messages related to or generated by these protocols and applications in bulk and at high speed. This may allow error events or problems to be tested. vCs 814 and/or servers 816 may also include multiple applications, such as: analytics, reporting, location services (e.g., by triangulation and/or trilateration), testing at a customer location for operational verification (as described further below with reference to FIG. 9), Domain Name System (DNS), Remote Authentication Dial In User Service (RADIUS), accounting, Captive Portal authentication, Hotspot 2.0 features such as credential and policy provisioning, etc.

By suitable initial configuration of vUEs 812 and vAPs 810, many different complicated end-to-end system-level testing suites can be performed. For example, a location-based analytics system for a shopping mall may produce floor plans overlaid with footfall traffic (in particular, where people walk inside the mall and how long they remain at different locations). A test configuration may be setup in which geospatial coordinates (latitude, longitude, floor number) are assigned to 100 vAPs and 1000 vUEs, e.g., spreading them throughout a virtual mall. Each vUE may also be initially provisioned with a path within the mall that it traverses over the test duration. The output of the testing may be a footfall traffic map generated by the location server or application (such as one of applications in a server 816-4, which is accessed via network 818, e.g., the Internet). This footfall traffic map may be compared with the configured virtual paths traversed by the vUEs during the testing. Thus, this system provides for large-scale, repeatable, end-to-end system testing.

Similarly, this system may perform end-to-end traffic analytics testing. For example, a service provider may have a Wi-Fi managed-service business in which it manages the Wi-Fi networks for 60,000 different tenants across the western United States. In order to virtually test this system, a test configuration may be setup by first configuring 60,000 virtual venues and then placing within these venues the virtual tenant's vAPs. If there are, on average, five APs per venue, then a total of 300,000 vAPs may be virtually configured for the testing scenario along with 3,000,000 vUEs. Each vUE may be configured to upload and download a certain amount of traffic (measured in megabytes). The amount of traffic measured by the analytics server may be compared to the amount of uploaded and downloaded traffic reported by an FTP client application in each of the vUEs. Thus, this system also provides for large-scale, repeatable, end-to-end system testing.

While the preceding examples were used as illustrations, note that this system may provide large-scale, repeatable, end-to-end system testing for applications other than location and analytics services.

Thus, system 800 may provide end-to-end testing of system 800 at scale. Moreover, it may provide a unified environment with a repeatable set of tests. In addition, system 800 may be used for functional testing. Note that the data traffic exiting the interface to the one or more vCs 814 may be connected to other network equipment for testing, e.g., $3^{rd}$ generation partnership project core networking entities, such as package data network gateway and trusted WLAN access network.

Note that vUEs 812 in server 816-2 may be separated geographically from servers 816-1 and 816-3. For example, server 816-2 may be in a datacenter at a remote location and servers 816-1 and 816-3 may be located at a research and development facility. This may be an advantageous deployment when large-scale tests need to be performed. For example, the research and development facility may not have a sufficient number of servers. Therefore, multiple instances of server 816-2 may be instantiated in a public cloud datacenter, providing, for example, 100,000 instances of vUEs. The traffic from these 100,000 vUEs may then be routed via the Internet to the research and development facility. Similarly, multiple instances of server 816-1 and multiple instances of server 816-2 may be instantiated in a public cloud datacenter. This may provide, for example, 100,000 instances of vAPs and 1,000,000 instances vUEs. Note that server 816-3 with vCs 814 may be located at the research and development facility and may connected via the Internet to vAPs 810 in servers 816-1. In yet another example, a multi-site research and development organization is developing WLAN controllers in Sunnyvale, Calif. and APs in Boston, Mass. In this case, server 816-1 and server 816-2 may be located in Boston (which is convenient for the Boston-based AP developers) and server 816-3 may be located in Sunnyvale.

Although we describe system 800 in FIG. 8 as an example, in alternative embodiments, different numbers or types of virtual instances of electronic devices may be present. For example, some embodiments comprise more or fewer virtual instances of electronic devices. In particular, because of the virtual-machine implementation, any of servers 816 may be an arbitrary number of servers, which can spin up as many vAPs, vUEs and/or vCs as are needed for a given test scale. As another example, in another embodiment, different virtual instances of electronic devices are communicating packets or frames.

Figure 9:
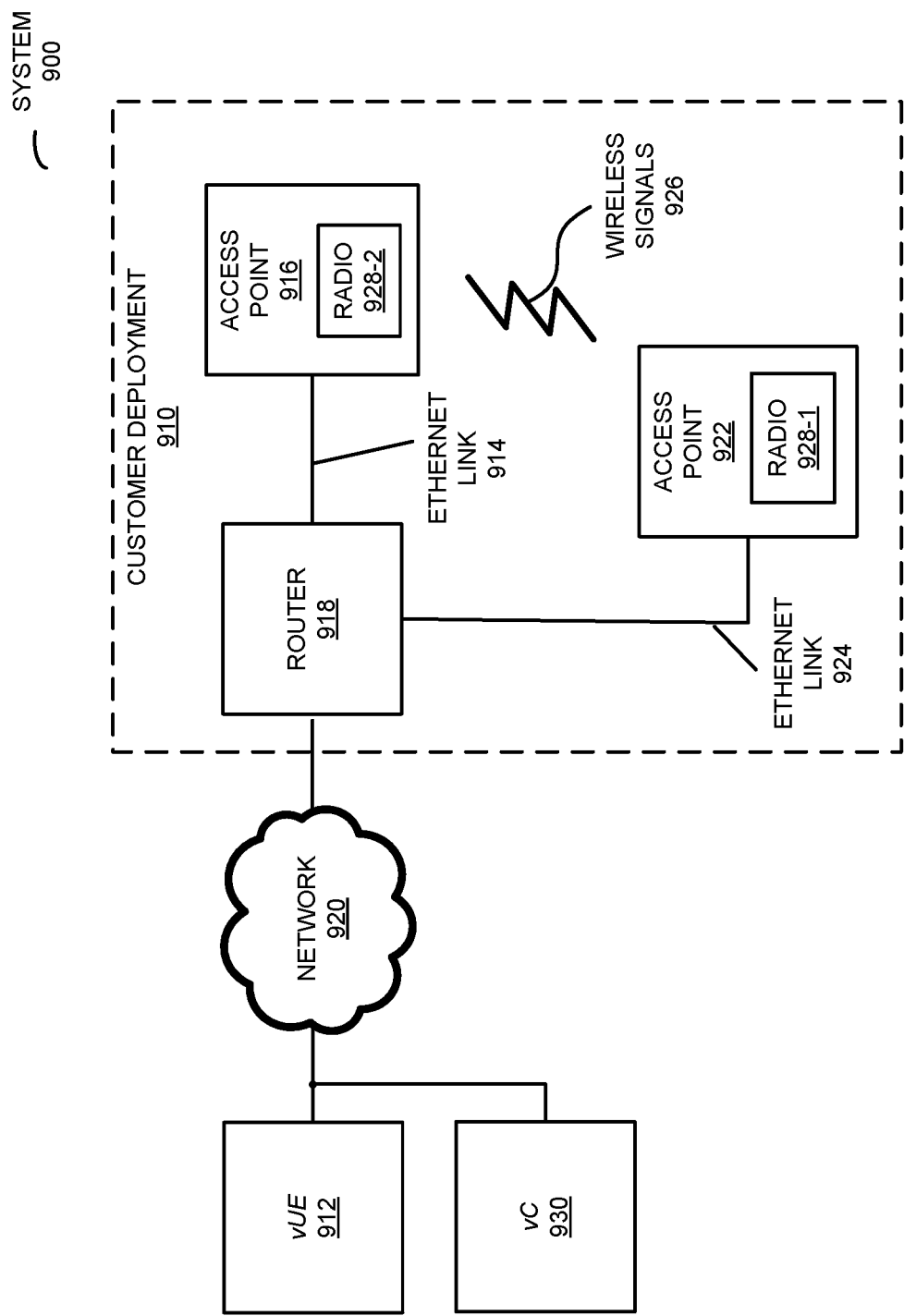
FIG. 9 is a block diagram illustrating testing of a system in accordance with embodiments of the present disclosure.

We now describe testing at a customer location of an AP that includes RFAL. In the preceding discussion, an AP with RFAL was used to facilitate fast and accurate testing of a system. In addition, the AP with RFAL may be used to facilitate testing at a customer location. This is shown in FIG. 9, which presents a block diagram illustrating testing of a system 900 in accordance with some embodiments. In system 900, vUE 912 is a virtual machine co-located (although as mentioned above, it need not be) with vC 930 virtual machine (e.g., in a data center), which includes RFAL. Thus, vUE 912 can simulate all or part of a customer deployment 910 (such as a building or a region) and can mimic Wi-Fi (i.e., simulate the wireless environment) by including tags in packets that are communicated using RFAL, network 920, router 918 and an Ethernet link 914 (as described previously). In some embodiments, vUE 912 and vC 930 work with physical components (e.g., AP 916 and AP 922) for testing. During normal operation, APs 916 and/or 922 have control connections (such as a secure shell tunnel) to vC 930. In some deployments, APs 916 and/or 922 have data tunnels (e.g., generic routing encapsulation) to vC 930 in addition to the control connection. Therefore, vUE 912 may generate frames that RFAL connects to RFAL in APs 916 and/or 922 using either the control connections or dataplane tunnels.

After receiving one or more frames containing the information from vUE 912, the software stack in AP 916 (which may be a real AP) may be exercised and tested, including subsequent interactions with router 918 and other physical or virtual instances of electronic devices (e.g., including, but not limited to, client devices, not shown) via network 920 (such as an intranet and/or the Internet). For example, AP 916 may associate, authenticate, get an IP address, resolve a uniform resource locator via a Domain Name System, and access a web page. Therefore, by using RFAL, vUE 912 and AP 916 may facilitate the measurement of key performance indicators during the testing, such as: the session setup time, the get IP address time, and/or web-page download time.

Alternatively or additionally, vUE 912 may communicate frames with AP 922 (which may be a real AP) in customer deployment 910 using RFAL and an Ethernet link 924. Then, AP 922 may forward the received frames by communicating wireless signals 926 (e.g., using Wi-Fi) to AP 916. In particular, wireless signals 926 (represented by a jagged line) are transmitted from a radio 928-1 in AP 922. These wireless signals are received by radio 928-2 in AP 916. Moreover, using wireless signals 926, AP 922 may transmit packets. In turn, these packets may be received by at least AP 916. This may allow AP 922 to communicate the frames to AP 916. (Alternatively, AP 916 may be a vAP, and radio 928-2 may be a virtual radio. In this case, instead of wireless signals 926, AP 922 may 'transmit' frames to AP 916 using RFAL.) Alternatively or additionally, vUE 912 can also inject RFAL frames into AP 922 via Ethernet Link 924 to simulate received wireless signals received by AP 922 from one or more electronic devices (not shown).

Note that APs 916 and 922 may wirelessly communicate while: transmitting advertising frames on wireless channels, detecting one another by scanning wireless channels, establishing connections (e.g., by transmitting beacons, probe requests, probe responses, authentication messages, association requests, association responses, etc.), and/or transmitting and receiving packets (which may include feedback about the communication and/or additional information as payloads). Furthermore, processing a packet or frame in APs 916 and 922 may include: receiving wireless signals 926 with the packet or frame; decoding/extracting the packet or frame from received wireless signals 926 to acquire the packet or frame; and processing the packet or frame to determine the payload contained in the packet or frame.

Next, the software stack in AP 916, as well as subsequent interactions with router 918 and other physical or virtual instances of electronic devices (not shown) via network 920, may be exercised and tested. By using AP 922, system 900 may assess the impact of wireless communication on the performance of system 900.

Thus, physical or virtual instances of electronic devices that include RFAL may generate synthetic traffic and may facilitate testing for troubleshooting system 900. This troubleshooting may allow customers to determine the cause of service or performance problems, and, more generally, may facilitate customer-experience monitoring for Wi-Fi. Traditionally, in-service testing is done reactively, that is, after a user calls in with a complaint. This testing technique is a proactive monitoring service that is intended to find and remediate network-related problems before being noticed by a user. Managed-service providers (MSPs) can offer this service for a fee to their customers (e.g., small and medium businesses, who are sometimes referred to as 'tenants'). In cases where tenants are responsible for portions of the network, system 900 may include a self-help portal. System administrators who work for the tenant can access the portal on their own (with explicit help from the MSP) to find and diagnose their own network problems.

Although we describe the network environment shown in FIG. 9 as an example, in alternative embodiments, different numbers or types of physical or virtual instances of electronic devices may be present. For example, some embodiments comprise more or fewer physical or virtual instances of electronic devices. As another example, in another embodiment, different physical or virtual instances of electronic devices are transmitting and/or receiving packets or frames.

We now describe embodiments of the AP. However, similar hardware and software may be included in UE. FIG. 10 presents a block diagram illustrating an AP 1000, such as AP 100 in FIGS. 1-3 or one of vAPs 810 in FIG. 8, in accordance with some embodiments. This AP includes processing subsystem 1010, memory subsystem 1012, and networking subsystem 1014. Processing subsystem 1010 includes one or more devices configured to perform computational operations. For example, processing subsystem 1010 can include one or more microprocessors, application-specific integrated circuits (ASICs), microcontrollers, programmable-logic devices, and/or one or more digital signal processors (DSPs).

Memory subsystem 1012 includes one or more devices for storing data and/or instructions for processing subsystem 1010 and networking subsystem 1014. For example, memory subsystem 1012 can include dynamic random access memory (DRAM), static random access memory (SRAM), and/or other types of memory. In some embodiments, instructions for processing subsystem 1010 in memory subsystem 1012 include: one or more program modules or sets of instructions (such as one or more program modules 1024, operating system 1026 and RFAL 1028), which may be executed by processing subsystem 1010. Note that the one or more computer programs may constitute a computer-program mechanism. Moreover, instructions in the various modules in memory subsystem 1012 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1010.

In addition, memory subsystem 1012 can include mechanisms for controlling access to the memory. In some embodiments, memory subsystem 1012 includes a memory hierarchy that comprises one or more caches coupled to a memory in AP 1000. In some of these embodiments, one or more of the caches is located in processing subsystem 1010.

In some embodiments, memory subsystem 1012 is coupled to one or more high-capacity mass-storage devices (not shown). For example, memory subsystem 1012 can be coupled to a magnetic or optical drive, a solid-state drive, or another type of mass-storage device. In these embodiments, memory subsystem 1012 can be used by AP 1000 as fast-access storage for often-used data, while the mass-storage device is used to store less frequently used data.

Networking subsystem 1014 includes one or more devices configured to couple to and communicate on a wired and/or wireless network (i.e., to perform network operations), including: control logic 1016, an interface circuit 1018 (which is sometimes referred to as a WLAN interface circuit'), a set of antennas 1020 and network interface circuit 1022. (While FIG. 10 includes set of antennas 1020, in some embodiments AP 1000 includes a set of nodes that can be coupled to set of antennas 1020. Thus, AP 1000 may or may not include set of antennas 1020.) For example, networking subsystem 1014 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system. Note that in some embodiments set of antennas 1020 includes multiple antenna elements in an adaptive array that can be selectively turned on and/or off by control logic 1016 to create a variety of antenna patterns.

Networking subsystem 1014 includes processors, controllers, radios or radio circuits (which communicate information using electromagnetic waves in the radio and/or microwave portions of the electromagnetic spectrum), power amplifiers, antennas, sockets, plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, AP 1000 may use the mechanisms in networking subsystem 1014 for performing simple wireless communication among the electronic devices, e.g., transmitting advertising or beacon frames and/or scanning for advertising frames transmitted by other electronic devices.

During operation of AP 1000, RFAL 1028 may be executed by processing subsystem 1010. As described previously, this program module may disable or decouple wireless communication by networking subsystem 1014 (including control logic 1016, interface circuit 1018 and/or set of antennas 1020). Instead, frames provided by an IEEE 802.11 driver (such as one of program modules 1024) are encapsulated with IP frames, which are then communicated on an Ethernet link to another electronic device (such as one of vUEs 812 in FIG. 8) using network interface circuit 1022. Moreover, a transmitter engine (such as another one of program modules 1024) may add tags with information specifying a simulated radio-frequency environment to the frames prior to communication by network interface circuit 1022.

Similarly, IP frames received by network interface circuit 1022 via an Ethernet link may be de-encapsulated by RFAL 1028 to frames that are compatible with an IEEE 802.11 communication protocol prior to processing by a remainder of the software stack (such as one or more program modules 1024 and/or operating system 1026 that perform functions other than wireless communication and those performed by RFAL 1028). Furthermore, a receiver engine (such as another one of program modules 1024) may extract tags with information specifying the simulated radio-frequency environment from the received frames.

Within AP 1000, processing subsystem 1010, memory subsystem 1012, and networking subsystem 1014 are coupled together using bus 1032. Bus 1032 may include an electrical, optical, and/or electro-optical connection that the subsystems can use to communicate commands and data among one another. Although only one bus 1032 is shown for clarity, different embodiments can include a different number or configuration of electrical, optical, and/or electro-optical connections among the subsystems.

In some embodiments, AP 1000 includes a display subsystem 1030 for displaying information on a display, which may include a display driver and the display, such as a liquid-crystal display, a multi-touch touchscreen, etc.

Access point 1000 (or other electronic devices, such as vUEs 812 in FIG. 8) can be (or can be included in) any electronic device with at least one network interface. For example, AP 1000 can be (or can be included in): a desktop computer, a laptop computer, a subnotebook/netbook, a server, a tablet computer, a smartphone, a cellular telephone, a consumer-electronic device, a portable computing device, an AP, a router, a switch, communication equipment, test equipment, and/or another electronic device.

Although specific components are used to describe AP 1000, in alternative embodiments, different components and/or subsystems may be present in AP 1000. For example, AP 1000 may include one or more additional processing subsystems, memory subsystems, networking subsystems, and/or display subsystems. Additionally, one or more of the subsystems may not be present in AP 1000. Moreover, in some embodiments, AP t 1000 may include one or more additional subsystems that are not shown in FIG. 10. Also, although separate subsystems are shown in FIG. 10, in some embodiments some or all of a given subsystem or component can be integrated into one or more of the other subsystems or component(s) in AP 1000. For example, in some embodiments one or more of program modules 1024 are included in operating system 1026 and/or control logic 1016 is included in interface circuit 1018.

Moreover, the circuits and components in AP 1000 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1014. The integrated circuit may include hardware and/or software mechanisms that are used for transmitting wireless signals from AP 1000 and receiving signals at AP 1000 from other physical instances of electronic devices. Aside from the mechanisms herein described, radios are generally known in the art and hence are not described in detail. In general, networking subsystem 1014 and/or the integrated circuit can include any number of radios. Note that the radios in multiple-radio embodiments function in a similar way to the described single-radio embodiments.

In some embodiments, networking subsystem 1014 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other physical instances of electronic devices and possibly performing one or more processing operations on the received signals, e.g., determining if the received signal comprises a probe reply frame, etc.)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While communication protocols compatible with Wi-Fi and Ethernet were used as illustrative examples, the described embodiments of the testing technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the testing technique may be implemented using one or more program modules 1024, operating system 1026 (such as a driver for network interface circuit 1022), and/or in firmware in networking subsystem 1014. Alternatively or additionally, at least some of the operations in the testing technique may be implemented in hardware in networking subsystem 1014.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
a network interface circuit;
a processor coupled to the network interface circuit; and
a memory, coupled to the processor, storing program instructions configured to be executed by the processor, wherein, when executed by the processor, the program instructions cause the electronic device to perform one or more operations comprising:
receiving, at the network interface circuit, a first media access control (MAC) layer protocol data unit (MPDU) associated with one or more virtual electronic devices or one or more physical electronic devices using a wired medium communication protocol;
de-encapsulating, from the first MPDU, a second MPDU compatible with a wireless communication protocol and additional information that characterizes simulated wireless communication of the second MPDU through a radio-frequency environment so that it appears as if the second MPDU was received by the electronic device using the wireless communication protocol; and
providing the second MPDU to a MAC layer associated with the wireless communication protocol.

2. The electronic device of claim 1, wherein, prior to the providing, the one or more operations comprise modifying the second MPDU based at least in part on the additional information, so that the second MPDU incorporates characteristics of the wireless communication through the radio-frequency environment.

3. The electronic device of claim 1, wherein providing the second MPDU to the MAC layer bypasses a physical layer associated with the wireless communication protocol.

4. The electronic device of claim 1, wherein the one or more virtual electronic devices are simulated during testing.

5. The electronic device of claim 1, wherein the additional information that characterizes the wireless communication is associated with a simulated radio-frequency environment.

6. The electronic device of claim 1, wherein the second MPDU is de-encapsulated without regard to a type of MPDU.

7. The electronic device of claim 1, wherein the wireless communication protocol comprises an Institute of Electrical and Electronics Engineers (IEEE) 802.11 communication protocol.

8. The electronic device of claim 1, wherein the wired communication protocol comprises an Ethernet communication protocol.

9. The electronic device of claim 1, wherein the one or more operations comprise establishing secure communication via a connection with the one or more virtual electronic devices or the one or more physical electronic devices.

10. The electronic device of claim 1, wherein the one or more operations comprise establishing a data tunnel with the one or more virtual electronic devices or the one or more physical electronic devices.

11. The electronic device of claim 1, wherein the one or more operations comprise exercising and testing a software stack in the electronic device based at least in part on the second MPDU.

12. The electronic device of claim 1, wherein, instead of providing the second MPDU to the MAC layer, the one or more operations comprise:
providing the second MPDU to a physical layer associated with the wireless communication protocol; and
providing, from the physical layer, the second MPDU using the wireless communication protocol.

13. The electronic device of claim 1, wherein the first MPDU originates from a location outside a radio-frequency range of the electronic device.

14. The electronic device of claim 1, wherein the network interface circuit is configured to communicate over at least one wired medium.

15. The electronic device of claim 1, wherein the additional information comprises one of: pathloss, data rate, modulation and coding scheme (MCS), signal-to-noise ratio (SNR), received signal-strength information (RSSI) and a phase angle of arrival.

16. A non-transitory computer-readable storage medium for use in conjunction with an electronic device, the computer-readable storage medium storing program instructions, wherein, when executed by the electronic device, the program instructions cause the electronic device to perform one or more operations comprising:
receiving, at a network interface circuit in the electronic device, a first media access control (MAC) layer protocol data unit (MPDU) associated with one or more virtual electronic devices or one or more physical electronic devices using a wired medium communication protocol;
de-encapsulating, from the first MPDU, a second MPDU compatible with a wireless communication protocol and additional information that characterizes simulated wireless communication of the second MPDU through a radio-frequency environment so that it appears as if the second MPDU was received by the electronic device using the wireless communication protocol; and
providing the second MPDU to a MAC layer associated with the wireless communication protocol.

17. The non-transitory computer-readable storage medium of claim 16, wherein, prior to the providing, the one or more operations comprise modifying the second MPDU based at least in part on the additional information, so that the second MPDU incorporates characteristics of the wireless communication through the radio-frequency environment.

18. The non-transitory computer-readable storage medium of claim 16, wherein providing the second MPDU to the MAC layer bypasses a physical layer associated with the wireless communication protocol.

19. A method for providing a second media access control (MAC) layer protocol data unit (MPDU), comprising:
by an electronic device:
receiving, at a network interface circuit in the electronic device, a first media access control (MAC) layer protocol data unit (MPDU) associated with one or more virtual electronic devices or one or more physical electronic devices using a wired medium communication protocol;
de-encapsulating, from the first MPDU, the second MPDU compatible with a wireless communication protocol and additional information that characterizes simulated wireless communication of the second MPDU through a radio-frequency environment so that it appears as if the second MPDU was received by the electronic device using the wireless communication protocol; and
providing the second MPDU to a MAC layer associated with the wireless communication protocol.

20. The method of claim 19, wherein, prior to the providing, the method comprises modifying the second MPDU based at least in part on the additional information, so that the second MPDU incorporates characteristics of the wireless communication through the radio-frequency environment.

\* \* \* \* \*